(12) United States Patent
Kieu et al.

(10) Patent No.: US 9,140,959 B2
(45) Date of Patent: Sep. 22, 2015

(54) DISSIPATIVE SOLITON MODE FIBER BASED OPTICAL PARAMETRIC OSCILLATOR

(71) Applicants: CANON KABUSHIKI KAISHA, Tokyo (JP); The Arizona Board of Regents on behalf of the University of Arizona, Tucson, AZ (US)

(72) Inventors: Khanh Kieu, Tucson, AZ (US); Thanh Nam Nguyen, Tucson, AZ (US); Nasser Peyghambarian, Tucson, AZ (US); Takefumi Ota, Tucson, AZ (US)

(73) Assignees: Canon Kabushiki Kaisha, Tokyo (JP); THE ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 14/312,407

(22) Filed: Jun. 23, 2014

(65) Prior Publication Data

US 2015/0015938 A1    Jan. 15, 2015

Related U.S. Application Data

(60) Provisional application No. 61/845,767, filed on Jul. 12, 2013, provisional application No. 61/953,434, filed on Mar. 14, 2014.

(51) Int. Cl.
*H01S 3/00* (2006.01)
*G02F 1/39* (2006.01)

(52) U.S. Cl.
CPC .......... *G02F 1/395* (2013.01); *G02F 2001/392* (2013.01); *H01S 3/0092* (2013.01)

(58) Field of Classification Search
CPC ..................................................... H01S 3/0092
USPC ............................ 359/330, 337.5, 333, 346
See application file for complete search history.

(56) References Cited

U.S. PATENT DOCUMENTS

| 4,039,851 A | 8/1977 | Jain et al. |
| 5,195,104 A * | 3/1993 | Geiger et al. ................... 372/97 |
| 5,513,194 A | 4/1996 | Tamura et al. |

(Continued)

FOREIGN PATENT DOCUMENTS

| JP | 2011-145402 A | 7/2011 |
| WO | 2013/052711 A2 | 4/2013 |

(Continued)

OTHER PUBLICATIONS

K. Tamura, E. P. Ippen, H. A. Haus, L. E. Nelson, 77-fs Pulse Generation from a Stretched-Pulse Mode-Locked All-Fiber Ring Laser, Optics Letters, Jul. 1, 1993, 18(13):1080-1082, Optical Society of America, Washington, DC, 1993.

(Continued)

*Primary Examiner* — Mark Hellner
(74) *Attorney, Agent, or Firm* — Canon USA, Inc., IP Division

(57) ABSTRACT

A fiber optic parametric amplifier that includes a resonating cavity. The resonating cavity includes linear fiber optic gain medium, with negative chromatic dispersion; and a nonlinear fiber optic gain medium with positive chromatic dispersion.

36 Claims, 14 Drawing Sheets

(56) References Cited

U.S. PATENT DOCUMENTS

| | | | |
|---|---|---|---|
| 5,841,570 A | 11/1998 | Velsko | |
| 5,946,129 A | 8/1999 | Xu et al. | |
| 6,501,591 B1 | 12/2002 | Kumar et al. | |
| 6,958,855 B2 | 10/2005 | Kumar et al. | |
| 7,298,545 B2 | 11/2007 | Kung et al. | |
| 7,898,731 B2 | 3/2011 | Sharping et al. | |
| 8,384,990 B2 | 2/2013 | Vodopyanov et al. | |
| 8,477,410 B2 | 7/2013 | Hodgson et al. | |
| 8,482,847 B2* | 7/2013 | Kuo et al. | 359/330 |
| 8,750,339 B1* | 6/2014 | Di Teodoro et al. | 372/6 |
| 2004/0190119 A1 | 9/2004 | Tauser et al. | |
| 2009/0041062 A1* | 2/2009 | Liu | 372/6 |
| 2009/0141340 A1 | 6/2009 | Sharping et al. | |
| 2010/0328761 A1 | 12/2010 | Reid et al. | |
| 2011/0134433 A1* | 6/2011 | Yamada | 356/479 |
| 2011/0261438 A1 | 10/2011 | Vodopyanov | |
| 2012/0062983 A1 | 3/2012 | Imeshev et al. | |
| 2012/0205352 A1 | 8/2012 | Fermann | |
| 2012/0230354 A1* | 9/2012 | Huber et al. | 372/6 |
| 2012/0236395 A1 | 9/2012 | Shuman | |
| 2012/0257270 A1* | 10/2012 | Kuo et al. | 359/330 |
| 2012/0301148 A1 | 11/2012 | Watanabe | |
| 2012/0327960 A1 | 12/2012 | Wise et al. | |
| 2013/0314767 A1* | 11/2013 | Kuo et al. | 359/330 |

FOREIGN PATENT DOCUMENTS

| | | |
|---|---|---|
| WO | 2013/078215 A1 | 5/2013 |
| WO | 2013/148757 A1 | 10/2013 |

OTHER PUBLICATIONS

Andy Chong, Joel Buckley, Will Renninger, Frank Wise, All-Normal-Dispersion Femtosecond Fiber Laser, Optics Express, Oct. 16, 2006, 14(21):10095-10100, Optical Society of America, Washington, DC, 2006.

Yujun Deng, Qiang Lin, Fei Lu, Govind P. Agrawal, Wayne H. Knox, Broadly Tunable Femtosecond Parametric Oscillator using a Photonic Crystal Fiber, Optics Letters, May 15, 2005, 30(10):1234-1236, Optical Society of America, Washington, DC, 2005.

C. J. S. De Matos, J. R. Taylor, K. P. Hansen, Continuous-Wave, Totally Fiber Integrated Optical Parametric Oscillator using Holey Fiber, Optics Letters, May 1, 2004, 29(9):983-985, Optical Society of America, Washington, DC, 2004.

Kenji Numata Kenji Numata, Haris Riris, Steve Li, Stewart Wu, Stephan R. Kawa, Michael Krainak, James.Abshire, Development of Optical Parametric Amplifier for LIDAR Measurements of Trace Gases on Earth and Mars, 2011, Document ID: 20110023030, NASA STI Information Desk, Hampton, VA, 2011.

Stephane Balac, Fabrice Mahé, Embedded Runge—Kutta Scheme for Step-Size Control in the Interaction Picture Method, Computer Physics Communications, Apr. 2013, 184(4):1211-1219, Elsevier Science Publishers BV, Amsterdam, NL, 2013.

Khanh Kieu, Masud Mansuripur, Femtosecond Laser Pulse Generation with a Fiber Taper Embedded in Carbon Nanotube/Polymer Composite, Optics Letters, Aug. 1, 2007, 32(15):2242-2244, Optical Society of America, Washington, DC, 2007.

Sigang Yang, Kenneth K. Y. Wong, Minghua Chen, Shizhong Xie, Fiber Optical Parametric Oscillator Based on Highly Nonlinear Dispersion-Shifted Fiber, Frontiers of Optoelectronics, Mar. 1, 2013, 6(1):25-29, Higher Education Press and Springer-Verlag Berlin Heidelberg DE, 2013.

A. Gershikov, E. Shumakher, A. Willinger, G. Eisenstein, Fiber Parametric Oscillator for the 2 μm Wavelength Range Based on Narrowband Optical Parametric Amplification, Optics Letters, Oct. 1, 2010, 35 (19):3198-3200, Optical Society of America, Washington, DC, 2010.

Steven T. Yang, Stephan P. Velsko, Frequency-Agile Kilohertz Repetition-Rate Optical Parametric Oscillator Based on Periodically Poled Lithium Niobate, Optics Letters, Feb. 1, 1999, 24(3):133-135, Optical Society of America, Washington, DC, 1999.

Newport Corporation, Tunable Laser Technology: Generating Wavelengths from the UV Through the IR, Photonics Handbook, Feb. 4, 2014, Photonics Media, Laurin Publishing Co., Inc., Pittsfield, MA, 2014.

G. K. L. Wong, S. G. Murdoch, R. Leonhardt, J. D. Harvey, V. Marie, High-Conversion-Efficiency Widely-Tunable All-Fiber Optical Parametric Oscillator, Optics Express, Mar. 19, 2007, 15(6):2947-2952, Optical Society of America, Washington, DC, 2007.

Cesar Jauregui, Alexander Steinmetz, Jens Limpert, Andreas Tünnermann, High-Power Efficient Generation of Visible and Mid-Infrared Radiation Exploiting Four-Wavemixing in Optical Fibers, Optics Express, Oct. 22, 2012, 20(22):24957-24965, Optical Society of America, Washington, DC.

Jay E. Sharping, Christiane Pailo, Chenji Gu, Leily Kiani, Jeremy R. Sanborn, Microstructure Fiber Optical Parametric Oscillator with Femtosecond Output in the 1200 to 1350 nm Wavelength Range, Optics Express, Feb. 15, 2010, 18(4):3911-3916, Optical Society of America, Washington, DC, 2010.

D. Chen, B. Sun, Multi-Wavelength Fiber Optical Parametric Oscillator Based On A Highly Nonlinear Fiber And A Sagnac Loop Filter, Progress In Electromagnetics Research, 2010, 106:163-176, EMW Publishing, Cambridge, MA, 2010.

Fatih Ö. Ilday, F. W. Wise, Nonlinearity Management: A Route to High-Energy Soliton Fiber Lasers, Journal of Optical Society of America B, Mar. 2002, 19(3):470-476, Optical Society of America, Washington, DC, 2002.

T. N. Nguyen, K. Kieu, A. V. Maslov, M. Miyawaki, N. Peyghambarian, Normal Dispersion Femtosecond Fiber Optical Parametric Oscillator, Optics Letters, Sep. 15, 2013, 38(18):3616-3619, Optical Society of America, Washington, DC, 2013.

Jay E. Sharping, Mark A. Foster, and Alexander L. Gaeta, Octave-Spanning, High-Power Microstructure Fiber-Based Optical Parametric Oscillators, Optics Express, Feb. 19, 2007, 15(4):1474-1479, Optical Society of America, Washington, DC, 2007.

Malcolm H. Dunn, Majid Ebrahimzadeh, Parametric Generation of Tunable Light from Continuous-Wave to Femtosecond Pulses, Science, Nov. 19, 1999, 286(5444):1513-1517, The American Association for the Advancement of Science, Washington, DC, 1999.

Y. Q. Xu, S. G. Murdoch, R. Leonhardt, J. D. Harvey, Raman-assisted continuous-wave tunable all-fiber optical parametric oscillator, Journal of Optical Society of America B, Jul. 2009, 26(7):1351-1356, Optical Society of America, Washington, DC, 2009.

F. Ö. Ilday, J. R. Buckley, W. G. Clark, F. W. Wise, Self-Similar Evolution of Parabolic Pulses in a Laser, Physical Review Letters, May 27, 2004, 92(21):213902-1-213902-4, The American Physical Society, College Park, MD, 2004.

Bill P.-P. Kuo, Nikola Alic, Paul F. Wysocki, Stojan Radic, Simultaneous Wavelength-Swept Generation in NIR and SWIR Bands Over Combined 329-nm Band Using Swept-Pump Fiber Optical Parametric Oscillator, Journal of Lightwave Technology, Feb. 15, 2011, 29(4):410-416, IEEE, Piscataway, NJ, 2011.

K. Kieu, W. H. Renninger, A. Chong, F. W. Wise, Sub-100 fs Pulses at Watt-Level Powers from a Dissipative-Soliton Fiber Laser, Optics Letters, Mar. 1, 2009, 34(5):593-595, Optical Society of America, Washington, DC, 2009.

R. Malik, M. E. Marhic, Tunable Continuous-Wave Fiber Optical Parametric Oscillator with 1-W Output Power, Conference on Optical Fiber Communication National Fiber Optic Engineers Conference, 2010 (OFC/NFOEC), Mar. 21-25, 2010, pp. 1-3, IEEE, Piscataway, NJ, 2010.

J. M. Chavez Boggio, S. Moro, B. P.-P. Kuo, N. Alic, B. Stossel, S. Radic, Tunable Parametric All-Fiber Short-Wavelength IR Transmitter, Journal of Lightwave Technology, Feb. 15, 2010, 28(4):443-447, IEEE, Piscataway, NJ, 2011.

Siddharth Ramachandran, John M. Fini, Marc Mermelstein, Jeffrey W. Nicholson, Samir Ghalmi, Man F. Yan, Ultra-Large Effective-Area, Higher-Order Mode Fibers: A New Strategy for High-Power Lasers, Laser & Photonics Reviews, Dec. 2008, 2(6):429-488, Wiley-Vch Verlag GmbH & Co. KGaA, Weinheim, DE, 2008.

(56) References Cited

OTHER PUBLICATIONS

Yue Zhou, Kim K. Y. Cheung, Sigang Yang, P. C. Chui, Kenneth K. Y. Wong, Ultra-Widely Tunable, Narrow Linewidth Picosecond Fiber-Optical Parametric Oscillator, IEEE Photonics Technology Letters, Dec. 1, 2010, 22 (23):1756-1758, IEEE, Piscataway, NJ, 2010.

Shinji Yamashita, Masahiro Asano, Wide and fast wavelength-tunable mode-locked fiber laser based on dispersion tuning, Optics Express, Oct. 2, 2006, 14(20):9299-9306, Optical Society of America, Washington, DC, 2006.

T. N. Nguyen, K. Kieu, R. Gowda, T. Ota, S. Uno, N. Peyghambarian, Widely Tunable Normal Dispersion Fiber Optical Parametric Oscillator, CLEO: Jun. 8-13, 2014, paper SM1O.7, Optical Society of America, Washington, DC, Jun. 13, 2014.

A. Y. H. Chen, G. K. L. Wong, S. G. Murdoch, R. Leonhardt, J. D. Harvey, J. C. Knight, W. J. Wadsworth, P. St. J. Russell, Widely Tunable Optical Parametric Generation in a Photonic Crystal Fiber, Optics Letters, Apr. 1, 2005, 30(7):762-764, Optical Society of America, Washington, DC, 2005.

Halina Abramczyk, Dispersion Phenomena in Optical Fibers, Technical University of Lodz, Laboratory of Laser Molecular Spectroscopy, 2005, p. 27-28 online [retrieved on Jun. 10, 2014]; URL: <http://www.mitr.p.lodz.pl/evu/lectures/Abramczyk3.pdf.>.

Michel E. Marhic, Fiber Optical Prametric Amplifiers, Oscillators and Related Devices, pp. 31-77, Cambridge University Press, 2007, Cambridge, UK.

Govind Agrawal, Nonlinear Fiber Optics, 4th ed., pp. 25-50, Elsevier/Academic Press, Oct. 2006, Amsterdam NL, 2006.

William H. Renninger, Andy Chong, Frank W. Wise, Pulse Shaping and Evolution in Normal-Dispersion Mode-Locked Fiber Lasers, IEEE Journal of Selected Topics in Quantum Electronics, Feb. 2, 2012, 18(1):389-398, IEEE, Piscataway, NJ, 2012.

Y. Q. Xu, S. G. Murdoch, High Conversion Efficiency Fiber Optical Parametric Oscillator, Oct. 28, 2011, Optics Letters, 36(21):4266-4268, Optical Society of America, Washington, DC, 2011.

\* cited by examiner

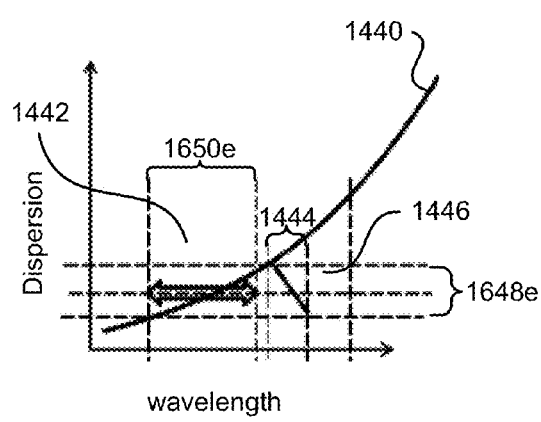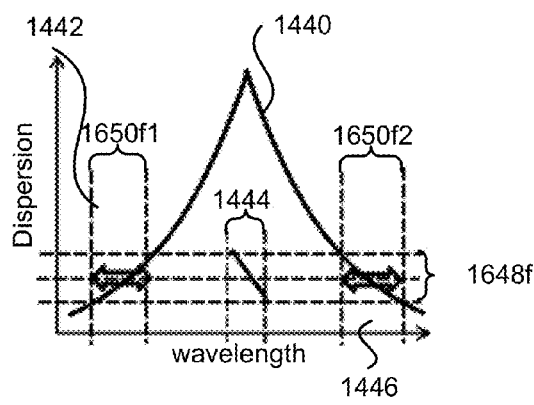
FIG. 16E
FIG. 16F

DISSIPATIVE SOLITON MODE FIBER BASED OPTICAL PARAMETRIC OSCILLATOR

CROSS REFERENCE TO RELATED APPLICATION

This application claims the benefit of U.S. Provisional Application No. 61/845,767, filed Jul. 12, 2013 and U.S. Provisional Application No. 61/953,434, filed Mar. 14, 2014. U.S. Provisional Application Nos. 61/845,767 and 61/953,434 are herein incorporated by reference in their entirety.

BACKGROUND

1. Field of Art

This disclosure generally relates to fiber based optical parametric oscillators.

2. Description of the Related Art

Light sources based on optical parametric interaction are interesting since they provide access to laser wavelengths that existing gain materials based on electronic transitions cannot provide. An optical parametric oscillator (OPO) can be realized by exploiting the $\chi^{(2)}$ nonlinear optical response in a wide range of crystals or the $\chi^{(3)}$ nonlinear response in optical fibers.

Optical fiber based OPO (FOPO) are particularly attractive owning to their potential in achieving low cost, alignment-free and compact laser systems while still providing very wide tuning range and high power operation.

The operation of FOPOs is in essence based on degenerated four-wave-mixing (FWM) wherein two pump photons interact with the fiber to generate a signal photon and an idler photon. The exact frequencies of the signal and idler photons are defined by the phase matching condition which depends on the pump laser wavelength, its peak power as well as the dispersion profile of the optical fiber. There are two common ways to pump an OPO. The first approach is continuous pumping where the pump laser is a continuous wave laser or a laser generating long pulses compared to the OPO cavity round trip time. The second approach is based on synchronous pumping of pulsed pump laser. In the second approach, the pump laser is synchronized with the OPO cavity.

Ultrafast synchronously pumped FOPOs have been demonstrated in the past. However, the output pulse energy and peak power of past FOPO have been quite modest. The best ultrafast FOPO that has been produced in the past in terms of output pulse energy and peak power was up to 2 nJ pulse energy and ~12 kW peak power). The technique used to achieve this was to use only 2 cm fiber length and the rest of the cavity was free-space optics. This implementation avoided the adverse influence of nonlinear effects but required the use of mostly free-space components so free-space alignment was required, and the problems that go along with such a system. What is needed is a high power ultrafast FOPO in an all-fiber laser cavity or mostly all-fiber laser cavity. What is also needed is an ability to tune the emission wavelength of the FOPO over a wide rage while providing high output pulse energy.

SUMMARY

An embodiment is a fiber optic parametric amplifier comprising: an input port for receiving an optical pump pulse, with a first pulse duration, at a pump wavelength; and a resonating cavity. The resonating cavity comprising: a first coupler for coupling the optical pump pulse into the resonating cavity; a linear fiber optic gain medium, with negative chromatic dispersion, that increases the intensity of the pump pulse and increases the first pump pulse duration to a second pump pulse duration after exiting the linear fiber optic gain medium; a nonlinear fiber optic gain medium with positive chromatic dispersion, that provides parametric gain to light which exits the linear fiber optic gain medium, the nonlinear optical gain medium transfers energy from the pump pulse after exiting the linear optical gain medium to a signal pulse with a first signal pulse duration after exiting the nonlinear fiber optic gain medium; and a power splitter. The power splitter receives light that exits the nonlinear fiber optic gain medium and provides: a first portion of the light that exits the nonlinear fiber optic gain medium to an output port to exit the resonating cavity; and a second portion of the light that exits the nonlinear fiber optic gain medium is fed back into the resonating cavity so that it passes through the linear fiber optic gain medium. The linear fiber optic gain medium increases the pulse duration of the signal pulse with a first pulse duration to a second signal pulse duration after exiting the linear fiber optic gain medium.

In an alternative embodiment the average chromatic dispersion of the resonating cavity is within the normal dispersion range.

In an alternative embodiment the second portion of the light that exits the nonlinear fiber optic gain medium that is provided by the power splitter is fed back into the resonating cavity via the first coupler.

In an alternative embodiment further comprises a seed laser for providing the optical pump pulse.

In an alternative embodiment the resonating cavity further comprises an optical delay line.

In an alternative embodiment the linear gain medium is an Erbium doped fiber optic amplifier.

In an alternative embodiment the resonating cavity further comprises a non-gain fiber that does not provide optical gain and has a chromatic dispersion that has a chromatic dispersion that is greater than the chromatic dispersion of the nonlinear fiber optic gain medium.

In an alternative embodiment a peak wavelength of the light that exits the output port is changed by changing a repetition rate of the pump pulse.

In an alternative embodiment the resonating cavity further comprises: a first wavelength division multiplexer for splitting the light in the resonating cavity into signal light and idler light, wherein the signal light has a first wavelength range that includes the signal pulse and the idler wavelength has a second wavelength range different from the first wavelength range; a second wavelength division multiplexer for combining the signal light and the idler light, wherein the combined light travels back through the resonating cavity together; a first fiber coupling the signal from the first wavelength division multiplexer to the second wavelength division multiplexer; and a second fiber coupling the signal from the first wavelength division multiplexer to the second wavelength division multiplexer.

In an alternative embodiment the length of the first fiber is different from the length of the second fiber.

In an alternative embodiment a material property of the first fiber is different from a material property of the second fiber.

In an alternative embodiment a peak wavelength of the light that exits the output port is changed by changing at least two properties of the pump pulse selected from the group consisting of: repetition rate of the pump pulse; center wavelength of the pump pulse; peak power of the pump pulse; repetition frequency of the pump pulse.

In an alternative embodiment the signal pulse is a soliton and pulse breaking is prevented by dissipative soliton mode locking in the resonating cavity.

In an alternative embodiment the peak wavelength of the light that exits the output port is changed by changing the length of the resonating cavity and the there is no spectral filter within the resonating cavity.

Further features and aspects will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments.

FIG. 16A-F are illustrations of tuning ranges.

DESCRIPTION OF THE EMBODIMENTS

Embodiments will be described below with reference to the attached drawings.

Nonlinear distortion leading to pulse breaking has been a dominant factor limiting the output peak power and pulse energy in standard ultrafast fiber lasers based on rare-earth-doped gain fibers. In order to reduce nonlinear distortion in the laser cavity of the OPO may be designed to have a highly chirped pulses within the resonator. Which effectively reduces the intra-cavity peak power and provides the pulse energy scaling capability. Operating the OPO in a normal dispersion regime can help ensure chirped pulse formation in the laser cavity of the OPO for either one or more, or all of the pump, idler, and signal. The normal dispersion regime refers to when the length averaged dispersion of entire OPO resonating cavity is less than zero in units of ps/nm/km. The anomalous dispersion regime refers to when the length averaged dispersion of entire OPO resonating cavity is greater than zero in units of ps/nm/km.

First Exemplary Embodiment

A first exemplary embodiment is a synchronously pumped fiber optical parametric oscillator (FOPO) operating in the normal dispersion regime. The FOPO generates chirped pulses at the output allowing significant pulse energy scaling potential without pulse-breaking. The average output power of the FOPO at 1600 nm was ~60 mW; corresponding to 1.45 nJ pulse energy and ~55% slope power conversion efficiency. The output pulses directly from the FOPO were highly chirped (~3 ps duration) and could be compressed outside of the cavity to 180 fs by using a standard optical fiber compressor having anomalous dispersion.

Figure 1:
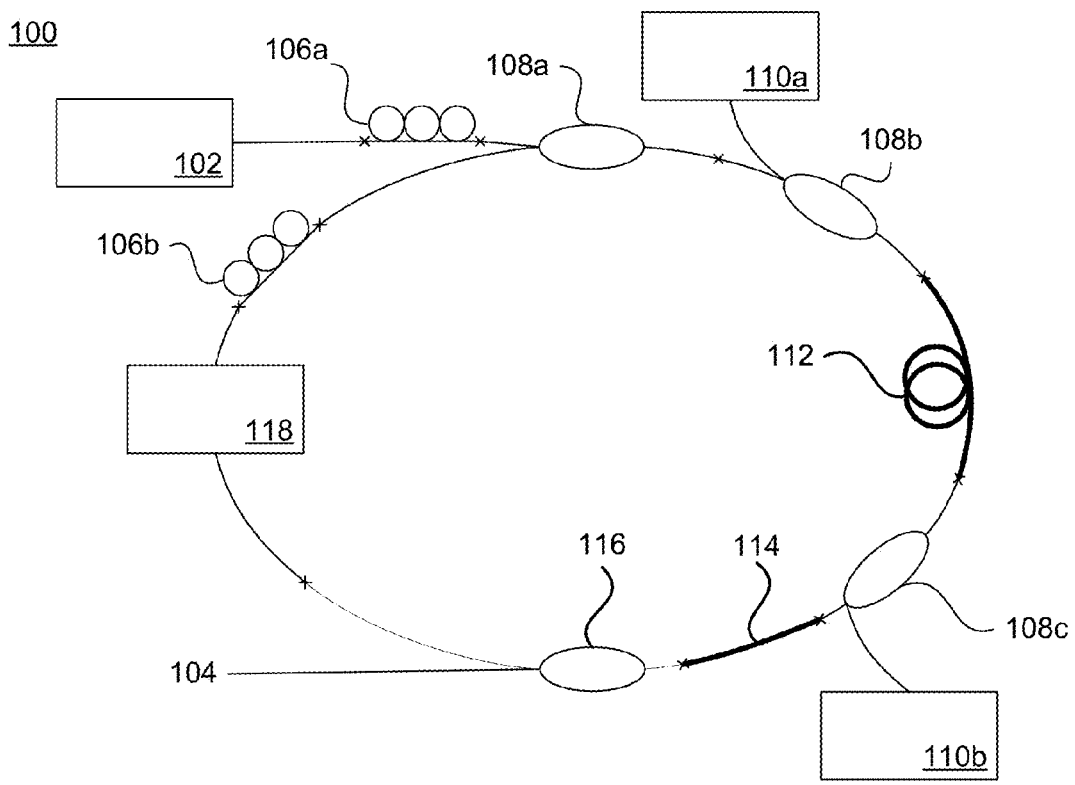
FIG. 1 is an illustration of a first exemplary embodiment of a FOPO.

A first exemplary embodiment 100 is a synchronously pumped FOPO operating in the normal dispersion regime and is pumped by a pump source (seed laser, pump laser) 102 which may be a compact Er-doped femtosecond fiber laser as illustrated in FIG. 1. The FOPO generated chirped pulses at an output 104 allowing significant pulse energy scaling potential without pulse-breaking. The obtained output average power from the FOPO at 1600 nm was ~60 mW corresponding to ~1.45 nJ pulse energy (taking into account the 42 MHz repetition rate) and ~55% slope power conversion efficiency. The output pulses directly from the FOPO were highly chirped with duration of ~3 ps but they could be compressed (by using a standard optical fiber having anomalous dispersion) to ~180 fs outside of the FOPO cavity.

FIG. 1 is a schematic diagram of the normal dispersion FOPO cavity. The pump source was an Er-doped femtosecond fiber laser working at 1560 nm with a fiber taper embedded in carbon nanotube/polymer composite saturable absorber. The repetition rate of the laser in this embodiment is 42 MHz corresponding to a cavity length of around 4.9 m. The seed laser 102 emitted nearly transform-limited pulses with pulse duration of 400 fs and about ~1 mW output average power. The seed laser 102 was coupled to a first polarization controller 106a. The first polarization controller 106a may have been spliced to a C port of a wavelength division multiplexer (WDM) coupler 108a. The first WDM coupler 108a may be a C/L band fused fiber coupler.

The pulse train from the seed laser is coupled into the FOPO cavity using the first WDM coupler 108a. The multiplexed port of the first WDM coupler 108a is spliced to a signal port of a second WDM coupler 108b. The second WDM coupler 108b may be a 980/1550 fused fiber coupler. A first 980 nm pump laser 110a is connected to a pump port of the second WDM coupler 108b. The multiplexed port of the fused fiber coupler is coupled to an Er-doped fiber (EDF) 112. The EDF 112 is spliced to a multiplexed port of a third WDM coupler 108c. The third WDM coupler 108c may be a 980/1550 fused fiber coupler. A second 980 nm pump laser 110b is connected to a pump port of the third fused fiber coupler 108c.

The pulse train from the seed laser is amplified by an Er-doped fiber amplifier (EDFA), which is described above is located inside the FOPO cavity. A pulse enters the EDFA as a seed and leaves as a pump. The length of the EDF 112 was 24 m and it was pumped from both sides as described above. The dispersion of the EDF is about −20 ps/nm/km at 1560 nm and −17 ps/nm/km at 1600 nm. The maximum average power of the amplified pump pulse train after the EDFA was measured to be about 175 mW (limited by the available 980 nm pump power).

The output of the EDFA exits the signal port of the third WDM 108c, which is spliced to dispersion shifted fiber (DSF) 114 which is used as the parametric gain medium. The DSF 114 may a standard DSF manufactured by Corning Inc. as the parametric gain medium (~5 m in length). The zero dispersion wavelength (ZDW) of the DSF 114 may be 1548 nm. The dispersion slope at the ZDW of the DSF 114 was 0.07 ps$^2$/nm/km. The output of the DSF 114 is spliced to an input port of a power splitter 116. The power splitter 116 may be a fused fiber coupler. The power splitter may have a 90%/10% split. The 90% output port may produce the output signal 104. The 10% output port may be spliced to an optical delay line (ODL) 118. The cavity length may be adjusted within a few centimeters using the fiber-coupled ODL 118. The output of the ODL 118 may be connected to a polarization controller 106b which may then be spliced to an L port of the first WDM coupler 108a, thus completing a resonant ring cavity for the FOPO.

Figure 2:
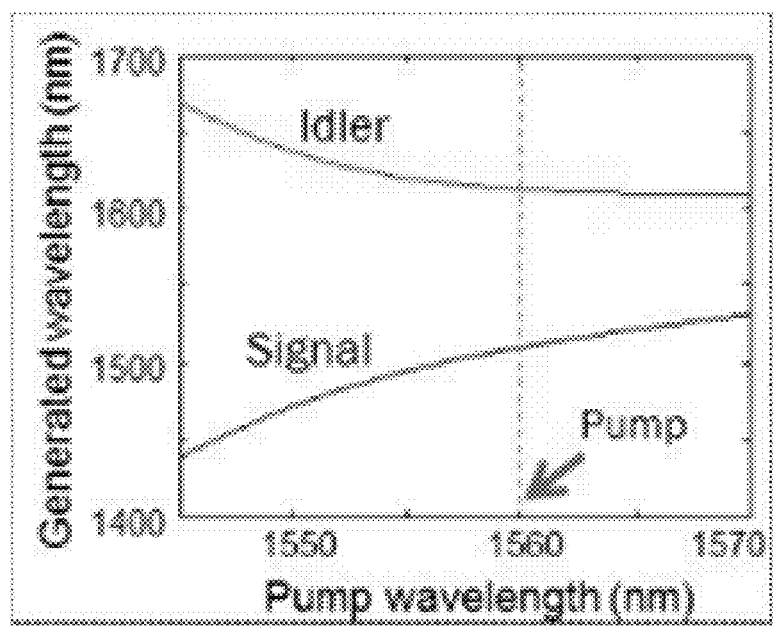
FIG. 2 is an illustration of the signal and idler wavelengths for a first exemplary embodiment.

Based on the theory of parametric phase matching conditions, the generated signal and idler wavelengths were calculated to be around 1510 nm and 1610 nm, respectively as illustrated in FIG. 2.

Figure 3:
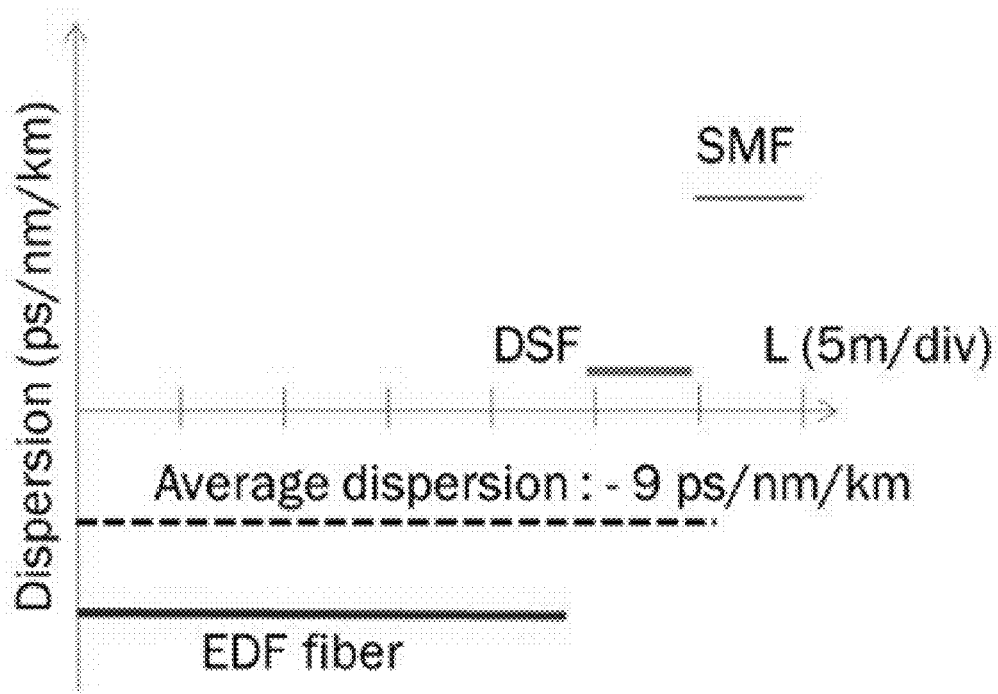
FIG. 3 is a dispersion map for a first exemplary embodiment.

FIG. 3 is an illustration of a dispersion map of the OPO cavity. The average cavity dispersion at the idler wavelength (1600 nm) was estimated to be around −9 ps/nm/km, which is in the normal dispersion regime. A dichroic filter may also be inserted at the ODL 118 to remove any residual pump light to improve the stability of the FOPO. The dichroic filter may also block the generated signal wave so that only the idler wave makes the round trip in the resonating ring cavity and resonates. Due to the long length of the EDF and the DSF needed in this cavity, we operated the FOPO at 7 times of the cavity length of the pump laser (besides the EDF and the DSF the rest of the cavity consisted of standard SMF-28 fiber). Therefore, there were 7 idler pulses circulating in the cavity at the same time.

In an alternative embodiment the cavity maybe use a shorter EDF 112 to make the total cavity length shorter so that there will be only one idler pulse per cavity round trip.

The two polarization controllers 106a-b were used to optimize the polarization states of the pump and the resonating idler waves to achieve the best conversion efficiency. In an alternative embodiment, polarization maintaining fiber may be used throughout.

The introduction of the EDFA within the FOPO cavity is a novel feature which provides several important advantages. The EDF provides the required normal dispersion for the chirped pulse operation. The 1560 nm pump pulses also acquired a similar positive chirp by propagating through the EDF. Due to the interplay between gain, Kerr nonlinearity, and normal dispersion, the pump pulses were stretched to picosecond range which ensures good chirp synchronization and temporal overlap with the resonating idler in the cavity. The FOPO cavity length could be measured accurately by removing the pump blocking dichroic filter and switching off the external pump pulse train so that the FOPO could lase on its own (around 1570 nm) from the gain that the EDF provided. The exact longitudinal mode spacing, which is directly connected to the laser cavity length, can then be measured by using a fast photodetector and an RF spectrum analyzer. Generally, it is quite time consuming to match the cavity length of an OPO with that of the pump laser since the OPO would oscillate only when perfect cavity length matching is achieved. This approach enables quick and precise cavity length estimation reducing the time needed to construct a FOPO.

An alternative embodiment may include an isolator to ensure that there ring cavity operates in a single direction. The isolator may be a fiber coupled isolator located between the first WDM coupler 108a and the second WDM coupler 108b. The isolator may be a free space isolator located in the ODL 118. The isolator may be located between the 10% port of the power splitter 116 and the first WDM coupler 108a. The isolator may be optimized for the C-band, C+L band or the L-Band. The isolator may include a dichroic filter.

Experimental Results of First Exemplary Embodiment

Figure 4:
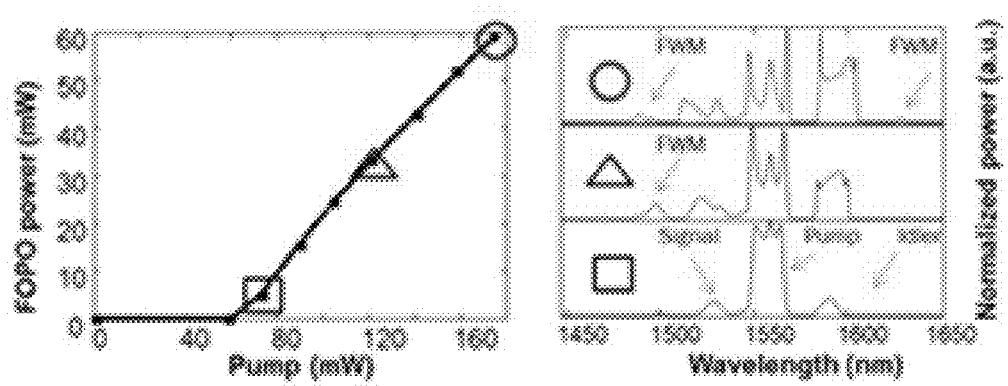
FIG. 4 is an illustration of power and spectra of the first exemplary embodiment.

During the operation of the FOPO 100 the idler pulses are generated as soon as the pump power is increased above the threshold level of about 65 mW. The evolution of the FOPO output power 104 as function of the pump power is illustrated in FIG. 4. The evolution of the optical spectra of the pump, signal, and idler waves at different pumping powers (70 mW, 120 mW, and 175 mW) is also illustrated in FIG. 4. A clear square-like shape of the spectrum of the FOPO idler wave, which is a typical spectral shape for mode-locked lasers operating in the normal dispersion regime, was observed. At the highest available pump power, the full width at half maximum (FWHM) spectral bandwidth of the FOPO was measured to be 20 nm which could support ~170 fs pulses after de-chirping. At high pump powers, several FWM peaks (due to interaction between the signal/pump and idler/pump waves) were also observed. The FWM peaks in the shorter wavelength sides were more pronounced because the ZDW of the DSF was at 1548 nm making it more favorable for phase matching at the shorter wavelength side of the 1560 nm pump.

At ~175 mW of pump power, the highest generated output power of the idler alone was measured to be ~60 mW (after using a dichroic filter to remove the residual pump light at 1560 nm as well as the generated signal light at ~1525 nm). This corresponded to the idler pulse energy of ~1.45 nJ taking into account the 42 MHz repetition rate. The maximum power conversion efficiency, which is defined as the ratio between the converted output power to the total pump power, was calculated to be 34% at 175 mW pump power. The estimated slope conversion efficiency was ~55%. We attribute this achieved high conversion efficiency to the degenerated FWM gain (from the pump to idler/signal) and an additional FWM gain (from pump and idler to signal). This will be clarified more in the next section.

To investigate the robustness of the FOPO against cavity detuning, we adjusted the cavity length and observed the output spectral shift. We could change the FOPO cavity length up to 6 mm in total and still observed good power output. The resonating idler signal wavelength shifted from 1585 nm to 1615 nm for the whole tuning range. The output spectra's envelop reflected well the calculated shape of the DSF gain spectrum.

The idler pulses were highly chirped at the output of the FOPO. We used a standard single mode fiber (SMF-28) to compensate for the accumulated chirp (or to de chirp). The pulse duration close to the output of the FOPO was ~3 ps. And the pulsed could be compressed to close to transform-limited duration ~180 fs using ~10 m of SMF-28. The peak power was estimated to be about 8 kW given the 1.45 nJ pulse energy.

Second Exemplary Embodiment

Figure 7:
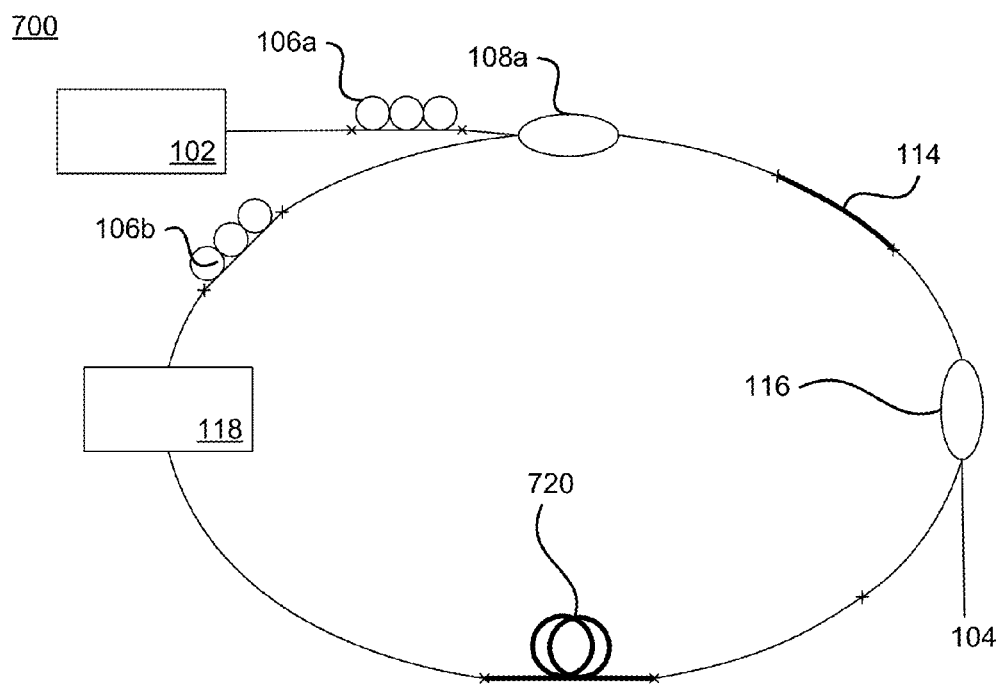
FIG. 7 is an illustration of a second embodiment of a FOPO.

A second exemplary embodiment 700 is described with reference to FIG. 7. Configurations common to those of the first exemplary embodiment 100 will be denoted by the same reference numerals as those of the first exemplary embodiment and the description thereof will be omitted.

The second exemplary embodiment 700 is identical the first exemplary embodiment 100 except that it does not include the EDFA. The second exemplary embodiment 700 further includes single mode fiber 720.

Numerical Simulation of First Exemplary Embodiment

Figure 5:
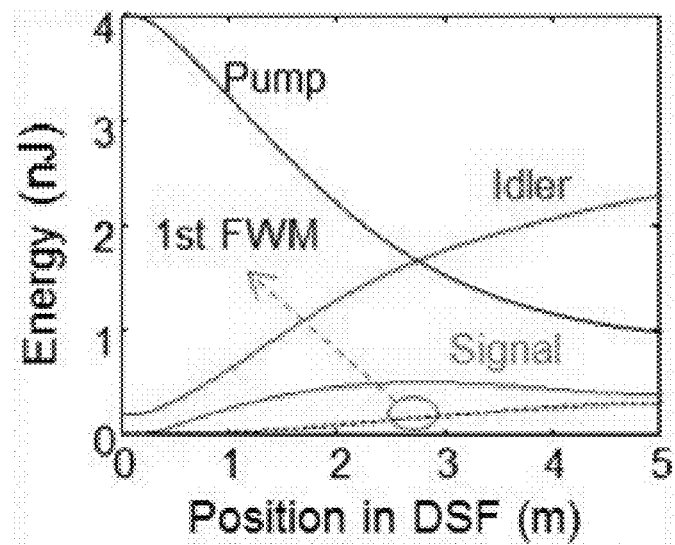
FIG. 5 is an illustration of the evolution of the optical power in the dispersion shifted fiber.

A numerical simulation using realistic experimental parameters can be used to simulate the formation as well as the evolution of the idler pulses around the FOPO cavity. A model maybe built based on the nonlinear Schrodinger equation. A fourth order Runge-Kutta in the interaction picture (RK4-IP) method may be used to solve the equation numerically. The pump pulses were assumed to have a Gaussian shape. The resonating idler wavelength maybe calculated using the phase matching curve for estimating the DSF. The delay between the pump and idler pulses may then be calculated using the dispersion profiles of all the fibers used in the cavity to satisfy the cavity synchronization requirement. Depending on the pump power, the resonating idler wave in the FOPO cavity reached steady state after about a hundred roundtrips. With 175 mW pump power, a clean Gaussian time profile with time duration of 3.7 ps idler wave was obtained at the output of the simulated FOPO. Its wavelength was ~1600 nm. The applicant has found that these results were in good agreement with the experimental results The evolution of output power of the FOPO as function of pump power as well as the output spectra corresponding to the three different output powers corresponds well with what was observed above experimentally. High conversion efficiency can be achieved via an assisted Raman process. However, the applicant has determined that this is not the case for the first exemplary embodiment 100 since an intra-cavity filter was not used to produce the experimental and numerical results above, and the peak of the Raman gain in silica fiber is around 1670 nm (when pumped at 1560 nm) whereas our generated idler (1600 nm) was located quite far away from the peak of the Raman gain. The applicants have concluded that a new mechanism involved in the setup of the first exemplary embodiment. Looking closely at the experimental and simulation results, the applicant determined that the number of photons in the idler and the signal are unequal. The applicants have concluded that the high conversion efficiency observed was due to an additional FWM process which happens between the pump photon and the generated signal photon which actually supplied additional energy to the idler wave. To confirm this new mechanism, we plotted the simulated evolution of the pulse energy contained in the pump, the signal, the idler, and the generated FWM waves in the DSF fiber when the pump power was fixed at 175 mW as shown in FIG. 5. At the first 1 m of the DSF, degenerated FWM occurred due to the pump pulse and the signal/idler waves grew gradually. After about 1.5 m of DSF, the growing speed of the idler was higher than that of the signal because of the appearance of another FWM process between the pump and the signal waves. From 1.5 m to 3 m of the DSF, the signal wave was growing and transferring energy simultaneously to the 1st FWM wave and the signal at around 1600 nm. After 3 m of the DSF, the signal wave stopped growing. All of the energy received from the pump was immediately transferred to the signal and the 1st FWM wave. This explains why the idler wave had much higher energy than the signal wave at the end of the DSF.

Figure 6:
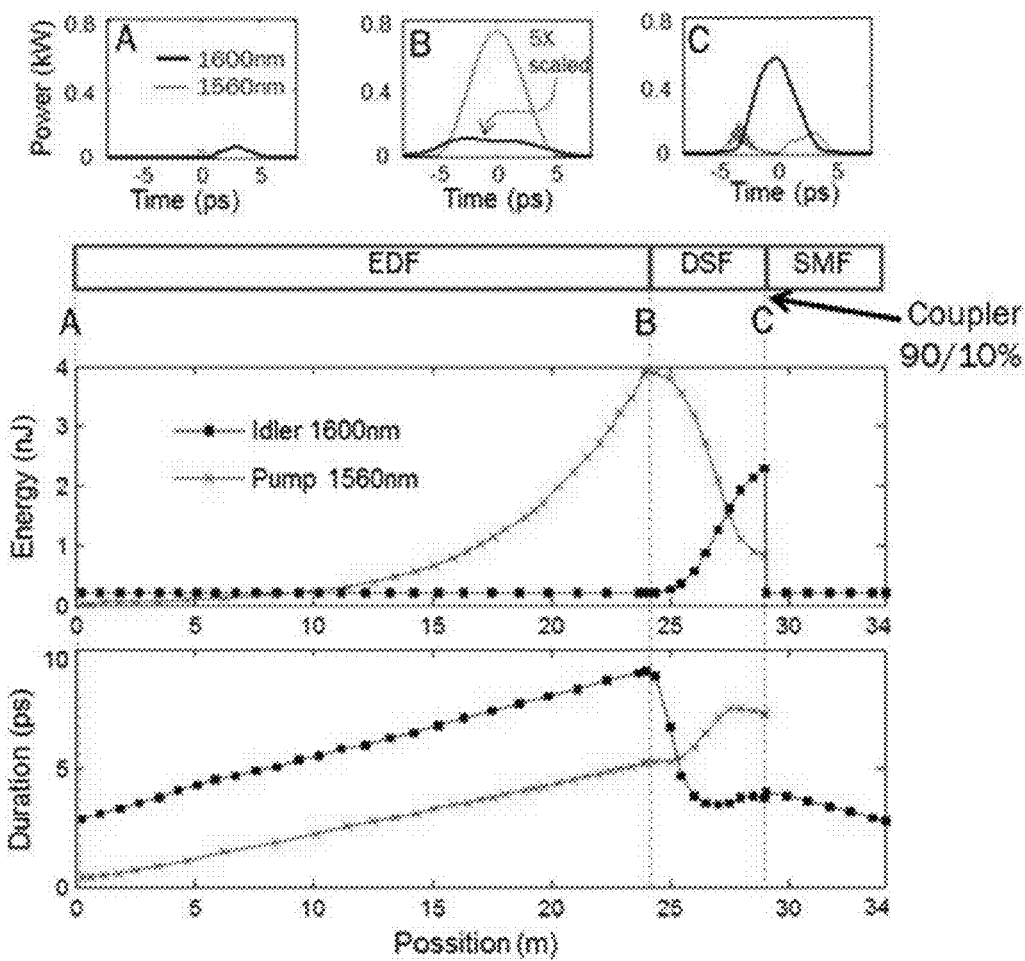
FIG. 6 is an illustration of the evolution of energy and duration of pulses propagating in the resonating cavity.

To have a better understanding of the evolution of the laser pulses around the FOPO cavity, the pulse energy and pulse duration of the generated idler and the pump waves around the cavity are illustrated in FIG. 6. The pulse profile at 1560 nm and 1600 nm are illustrated at points A, B, and C. The results show that both the generated idler and the pump pulses acquired a significant amount of chirp and stretched in time when passing through the EDF, from point A to point B. The duration (at FWHM) of the idler pulse increased from 2.7 ps to 8.5 ps while the pump pulse stretched from 0.4 ps to 5.5 ps by propagating through the EDF, from point A to point B. In the numerical simulations, only the pump pulses were amplified significantly in this stage due to the gain of the EDF. In the DSF, from point B to point C, the pump energy transferred to the idler via the parametric interaction. At the first half of the DSF, the central part of the idler grew faster than other parts leading to a narrower pulse width (from 8.5 ps down to 3.5 ps). Whereas the pump pulse duration increased because the central part of the pump went down. At the second half of the DSF, when the central part of the pump transferred most of its energy to the idler, the duration of the idler started to increase slightly since its leading edge and trailing edge were amplified more than the central part of the pulse. The pump duration decreased slightly in this segment. At the end of the DSF, the central part of the pump is completely converted to the idler wave making a hole in its temporal profile as illustrated by the power profiles at point C, while the temporal profile of the amplified idler wave was quite close to a Gaussian shape. 90% of the idler was then coupled to the output of the cavity after the DSF. In the SMF-28, only 10% of the idler propagates. Its duration decreases from 3.7 ps to 2.7 ps due to the anomalous dispersion of the SMF-28. The same evolution repeated again in the next round trip.

Wavelength Tuning of the Output of the FOPO

It is often desirable to build FOPO such as the one described in the first exemplary embodiment 100 and the second embodiment 700 which is tunable. Such that the output wavelength of the FOPO is adjustable. Prior art methods of tuning have included placing a filter in the resonating cavity. The applicant's have discovered a variety of wavelength tuning methods that can be used to tune the FOPO. Wavelength tuning can be achieved by changing the length of the resonating cavity of the FOPO, changing the repetition rate of the seed pulse, or changing the wavelength of the pump pulse. These methods can be used separately or in combination with each other.

Since the parametric gain is narrower as the length of the fiber used for parametric gain is longer, the longer fiber works as a spectral filter. In this case, the wavelength tuning can be achieved by changing the wavelength or power of the seed pulse.

The pump pulse used in a FOPO is typically very narrow and is described in equation (0).

$$P_0 = P_0(t) \quad (0)$$

However, the pulse can be treated as a continuous wave when the spectrum width is narrow enough. Therefore, in the following discussion, we can treat the pump light as a CW light source. Gain for the signal or idler is described by $G_i$ in equations (1)-(5). An example of the waveguide described below is the DSF 114.

$$G_i(L) = \left(\frac{\gamma \cdot P_0}{g} \sinh(gL)\right)^2 \quad (1)$$

$$\gamma = \frac{n_2 \cdot \omega_p}{c \cdot A_{eff}} = \frac{2\pi \cdot n_2}{A_{eff} \cdot \lambda_p} \quad (2)$$

$$g^2 = -\Delta\beta \cdot (\Delta\beta/4 + \gamma P_0) \quad (3)$$

$$\Delta\beta = \beta_2 \cdot (\Delta\omega)^2 + 1;12\beta_4 \cdot (\Delta\omega)^4 \quad (4)$$

$$\Delta\omega = |\omega_s - \omega_p|, \Delta\omega = |\omega_i - \omega_p| \quad (5)$$

$\gamma$: Nonlinear coefficient of the waveguide 114
$P_0$: Pump power
L: Length of waveguide 114
$n_2$: Nonlinear index of waveguide 114
$A_{eff}$: Effective area of waveguide 114
$\beta_2, \beta_4$: are the second and fourth order dispersion parameters of the waveguide 114.
$\lambda_p$: Center wavelength of pump light
$\omega_p$: Angular frequency of pump light
$\omega_s$: Angular frequency of signal light
$\omega_i$: Angular frequency of idler light Since it is reasonable to assume that the parameter g is a rational number, therefore the limits for $\Delta\beta$ may be derived from equation (3) to be equation (6).

$$-4\gamma P0 < \Delta\beta < 0 \qquad (6)$$

Therefore, the maximum gain $G_i$ and the gain $G_i$ at the edges occur at following conditions listed in equation (7).

$G_{i,max}$ at $\Delta\beta = -2\gamma P_0$; $g = \gamma \cdot P_0$; $G_{i,max}(L) = \sin h^2(\gamma \cdot P_0 \cdot L)$ $G_{i,edge1}$ at $\Delta\beta = 0$; $g = 0$; $G_{i,edge1}(L) = 0$ $G_{i,edge2}$ at $\Delta\beta = -4\gamma P_0$; $g = 0$; $G_{i,edge2}(L) = 0$ \qquad (7)

According to equations (7) and (4), the frequency differences $\Delta\omega$ between the pump and the signal or the idler at the maximum and at the gain edges are calculated as follows. Equation (8) describes the frequency differences at the maximum gain $\Delta\omega_{max}$. Equation (9) describes the frequency differences at one of the gain edges $\Delta\omega_{edge1}$. Equation (10) describes the frequency differences at one of the gain edges $\Delta\omega_{edge2}$.

$$G_{i,max} \text{ at } \Delta\beta = -2 \cdot \gamma \cdot P_0 \qquad (8)$$

$$\beta_2 \cdot (\Delta\omega)^2 + \frac{1}{12} \cdot \beta_4 \cdot (\Delta\omega)^4 = -2 \cdot \gamma \cdot P_0$$

$$\Delta\omega_{max} = \pm \sqrt{6 \frac{-\beta_2 \pm \sqrt{\beta_2^2 - \left(\frac{2}{3}\right) \cdot \beta_4 \cdot \gamma P_0}}{\beta_4}}$$

$$G_{i,edge1} \text{ at } \Delta\beta = 0 \qquad (9)$$

$$\beta_2 \cdot (\Delta\omega)^2 + \frac{1}{12} \cdot \beta_4 \cdot (\Delta\omega)^4 = 0$$

$$\Delta\omega_{edge1} = \pm \sqrt{6 \frac{-\beta_2 \pm \sqrt{\beta_2^2}}{\beta_4}}$$

$$G_{i,edge2} \text{ at } \Delta\beta = -4 \cdot \gamma \cdot P_0 \qquad (10)$$

$$\beta_2 \cdot (\Delta\omega)^2 + \frac{1}{12} \cdot \beta_4 \cdot (\Delta\omega)^4 = -4 \cdot \gamma \cdot P$$

$$\Delta\omega = \pm \sqrt{6 \frac{-\beta_2 \pm \sqrt{\beta_2^2 - \left(\frac{4}{3}\right) \cdot \beta_4 \cdot \gamma \cdot P_0}}{\beta_4}}$$

As described in equation (1), the gain spectrum is a function of the length of the waveguide. As the length of waveguide increases, the gain spectrum width decreases. However, if the intensity of the pump light is kept constant, then the peak wavelength of the gain spectrum does not change, because the parameter "g" is not changed.

Meanwhile, the gain spectrum width at the full width at half maximum can be calculated by following equations (11)-(12). The edge wavelengths calculated by Equation (11) are nearer to the center wavelength than the edge wavelengths as calculated by Equations (6)-(10).

$$\frac{1}{2}(\sinh(\gamma \cdot P_0 \cdot L))^2 = \left(\frac{\gamma \cdot P_0}{g} \cdot \sinh(g \cdot L)\right)^2 \qquad (11)$$

$$\tfrac{1}{2} G_{i,max} = \tfrac{1}{2}(\sin h(\gamma \cdot P_0 \cdot L))^2, \text{ at } g = -2 \cdot \gamma \cdot P_0 \qquad (12)$$

Figure 8:
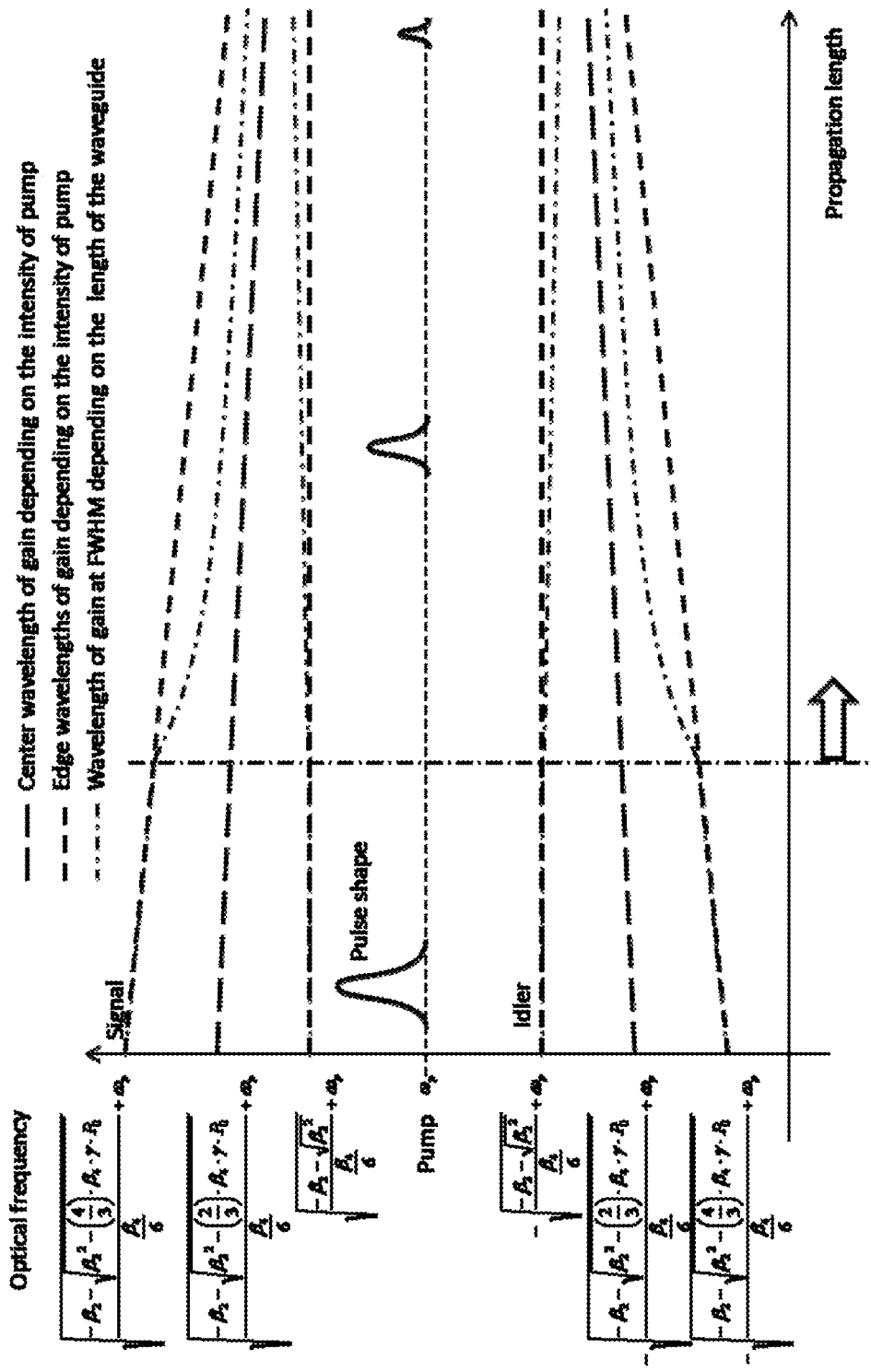
FIG. 8 is an illustration of a relationship between the pump light and the parametric gain spectrum in the waveguide is highly non-linear fiber.

FIG. 8 is an illustration of a relationship between the pump light and the parametric gain spectrum in the waveguide 114. The gain spectrum region is limited by Equations (6)-(10). Such that the edge wavelengths calculated by Equations (11)-(12) are farther from the center wavelength than the wavelengths calculated by Equations (6)-(10). This is indicative of a possible square-like shape to the spectrum. In addition to that, since the wavelength of pump light is close to the zero-dispersion wavelength of the waveguide 114, the pump pulse shape is kept. It is expected that as intensity of the pulse becomes smaller along the waveguide 114, energy is transferred from the pump to the signal and/or the idler.

The 1st order dispersion is considered to derive a relationship between the spectrum of the signal or the idler pulse, total dispersion of the FOPO and repetition rate of pump pulse. For a fiber parametric oscillator such as in the second embodiment 200 the round trip time of signal and idler pulse is estimated by equation (13).

$$T_{round-trip} = \left(\frac{n_{HNLF}(\omega_{0,HNLF})}{c} + \beta_{1,HNLF}(\omega_{s/i})\right) \cdot L_{HNLF} + \left(\frac{n_{ODCF}(\omega_{0,ODCF})}{c} + \beta_{1,ODCF}(\omega_{s/i})\right) \cdot L_{ODCF} \qquad (13)$$

$n_{HNLF}(\omega)$: Index at the frequency $\omega$ of highly nonlinear fiber (HNLF) 114 for parametric gain.

$n_{ODCF}(\omega)$: Index at the frequency $\omega$ of oscillator dispersion controlling fiber (ODCF) 720 for building the oscillator.

$\beta_{1,HNLF}(\omega)$: 1st order dispersion at the frequency $\omega$ of high nonlinear fiber (HNLF). The 1st order dispersion is equivalent to group velocity, i.e. velocity of the pulse propagating in the waveguide.

$\beta_{1,ODCF}(\omega)$: 1st order dispersion at the frequency $\omega$ of oscillator dispersion controlling fiber (ODCF). Wherein the ODCF are one more fibers which in combination with the HNLF are used to control the dispersion of the entire cavity.

c: Optical velocity in vacuum.

$\omega_0$: Angular frequency at zero-dispersion of the waveguide.

$\omega_{s/i}$: Angular frequency of signal light/idler light.

$L_{HNLF}$: Length of HNLF.

$L_{ODCF}$: Length of ODCF.

The relationship between index $n(\omega)$ and dispersion $\beta(\omega)$ is described by equation (14). Wherein the index $n(\omega)$ is the total refractive index including both linear and non-linear terms.

$$\beta(\omega) = n(\omega) \cdot \frac{\omega}{c} = \beta_0\bigg|_{\omega_0} + \sum \left(\frac{1}{i!} \cdot \left\{\left(\frac{d}{d\omega}\right)^i \beta(\omega)\right\}\bigg|_{\omega_0} \cdot (\omega - \omega_0)^i\right) \quad (14)$$

Thus equation (13) can be transformed to be written in terms of beta as described in equation (15).

$$T_{round-trip} = \left(\frac{\beta_{HNLF}(\omega_{0,HNLF})}{\omega_{0,HNLF}} + \beta_{1,HNLF}(\omega_{s/i})\right) \cdot L_{HNLF} + \left(\frac{\beta_{ODCF}(\omega_{0,ODCF})}{\omega_{0,ODCF}} + \beta_{1,ODCF}(\omega_{s/i})\right) \cdot L_{ODCF} \quad (15)$$

For the ODCF, the ODCF can consist of several kinds of fibers. Thus, the 2nd term of Equation (15) is described in equation (16). As described in equation (16) there are multiple fibers of multiple types, and lengths.

$$\left(\frac{\beta_{ODCF}(\omega_{0,ODCF})}{\omega_{0,ODCF}} + \beta_{1,ODCF}(\omega_{s/i})\right) \cdot L_{ODCF} = \sum_{ODCFk} \left(\left(\frac{\beta_{ODCFk}(\omega_{0,ODCFk})}{\omega_{0,ODCFk}} + \beta_{1,ODCFk}(\omega_{s/i})\right) \cdot L_{ODCFk}\right) \quad (16)$$

Given a pump pulse produced by the pump source 102 with a repetition rate $f_{rep}$ and a temporal width $\Delta\tau$. The gain pulse has the same temporal width as the pump pulse width $\Delta\tau$. And the gain pulse at the optical angular frequencies around $\omega_{s/i}$ should move at the same speed as the pump pulse of $$\frac{1}{\beta_{1,HNLF}(\omega_p)},$$

even though the 1st order dispersion of $\beta_{1,HNLF}(\omega_{s/i})$ is different from $\beta_{1,HNLF}(\omega_p)$. Therefore, the length of HNLF is calculated based on the period of time that the pulse, signal, and idler overlap as described in equation (17).

$$L_{HNLF} \leq \frac{2 \cdot \Delta\tau}{|\beta_{1,HNLF}(\omega_{s/i}) - \beta_{1,HNLF}(\omega_p)|} \quad (17)$$

However, the gain spectrum region is limited by Equations (6)-(10) and is a limited by the length as calculated in equation (17). If the non-linear fiber is longer, then the pump, signal, and idler no longer overlap and equations (6)-(10) are no longer as relevant.

Relationship Between the Repetition Rate and the Round Trip in the FOPO

The temporal width of the gain pulse is assumed to be $\Delta\tau$. Thus, equation (18) can be derived to describe amplifying the oscillating pulse.

$$\frac{1}{f_{rep}} - \frac{1}{2} \cdot \Delta\tau \leq T_{round-trip} \leq \frac{1}{f_{rep}} + \frac{1}{2} \cdot \Delta\tau \quad (18)$$

In accordance with equations (15), (16), and (18) equation (19) further describes amplifying the oscillating pulse.

$$\frac{1}{f_{rep}} - \frac{\Delta\tau}{2} \leq \left\{\left(\frac{\beta_{HNLF}(\omega_{0,HNLF})}{\omega_{0,HNLF}} + \beta_{1,HNLF}(\omega_{s/i})\right) \cdot L_{HNLF} + \sum_{ODCFk}\left(\left(\frac{\beta_{ODCFk}(\omega_{0,ODCFk})}{\omega_{0,ODCFk}} + \beta_{1,ODCFk}(\omega_{s/i})\right) \cdot L_{ODCFk}\right)\right\} \leq \frac{1}{f_{rep}} + \frac{\Delta\tau}{2} \quad (19)$$

From Equation (19) we can calculate the center wavelength and edge wavelengths of the signal or idler pulses as described in equations (20)-(22).

$$\left\{\left(\frac{\beta_{HNLF}(\omega_{0,HNLF})}{\omega_{0,HNLF}} + \beta_{1,HNLF}(\omega_{s/i\_c})\right) \cdot L_{HNLF} + \sum_{ODCFk}\left(\left(\frac{\beta_{ODCFk}(\omega_{0,ODCFk})}{\omega_{0,ODCFk}} + \beta_{1,ODCFk}(\omega_{s/i\_c})\right) \cdot L_{ODCFk}\right)\right\} = \frac{1}{f_{rep}} \Delta\tau \quad (20)$$

$$\left\{\left(\frac{\beta_{HNLF}(\omega_{0,HNLF})}{\omega_{0,HNLF}} + \beta_{1,HNLF}(\omega_{s/i\_fwhm1})\right) \cdot L_{HNLF} + \sum_{ODCFk}\left(\left(\frac{\beta_{ODCFk}(\omega_{0,ODCFk})}{\omega_{0,ODCFk}} + \beta_{1,ODCFk}(\omega_{s/i\_fwhm1})\right) \cdot L_{ODCFk}\right)\right\} = \frac{1}{f_{rep}} - \frac{\Delta\tau}{2} \quad (21)$$

$$\left\{\left(\frac{\beta_{HNLF}(\omega_{0,HNLF})}{\omega_{0,HNLF}} + \beta_{1,HNLF}(\omega_{s/i\_fwhm2})\right) \cdot L_{HNLF} + \sum_{ODCFk}\left(\left(\frac{\beta_{ODCFk}}{\omega_{0,ODCFk}} + \beta_{1,ODCFk}(\omega_{s/i\_fwhm2})\right) \cdot L_{ODCFk}\right)\right\} = \frac{1}{f_{rep}} + \frac{\Delta\tau}{2} \quad (22)$$

$\omega_{s/i\_c}$: Center angular frequency of the signal light/idler light.

$\omega_{s/i\_fwhm1}$: An angular frequency of the signal light/idler light at FWHM.

$\omega_{s/i\_fwhm2}$: Another angular frequency of signal light/idler light at FWHM.

As described by Equation (20), the center wavelength of signal and idler light are determined by total dispersion of the FOPO and the repetition rate of pump pulse. Therefore, the wavelength of the signal or idler can be controlled by changing the repetition rate of pump pulse.

In addition, the spectral width of the signal and idler light are determined by dispersion or temporal pulse width of pump pulse. Thus, the spectral width can be controlled by design of oscillator dispersion and/or pump pulse width. This effectively means that the temporal shape of the pump pulse can work as a spectral filter. Equations (21) and (22) do not completely describe all of forces shaping the spectral width of the signal and idler pulses there are also other nonlinear effects in the oscillator.

Third Exemplary Embodiment

A third exemplary embodiment is a specific example of the second embodiment 700 described above. In which the zero-dispersion wavelength is 1050 nm, a 3rd order dispersions of the HNLF 114 for parametric gain is 6.71776E-41 $s^3/m$, and 4th order dispersion of HNLF 114 for parametric gain is −9.83483E-56 $s^4/m$. For the pump pulse produced by the pump laser 102, the output wavelength is 1040 nm, the average power is 4 W, the repetition rate is 15 MHz, the temporal pulse width is 10 ps, and the spectral width is 0.11 nm.

Figure 9A:
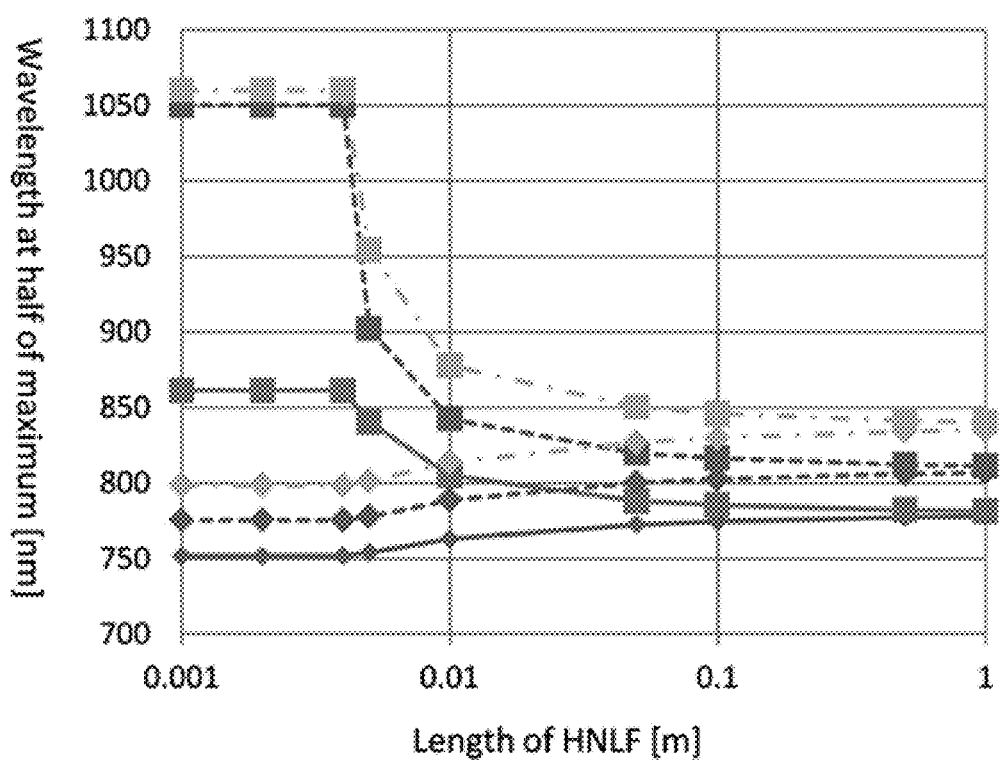
FIGS. 9A-B illustrate the simulated results of the evolution of the gain spectrum width.
Figure 9B:
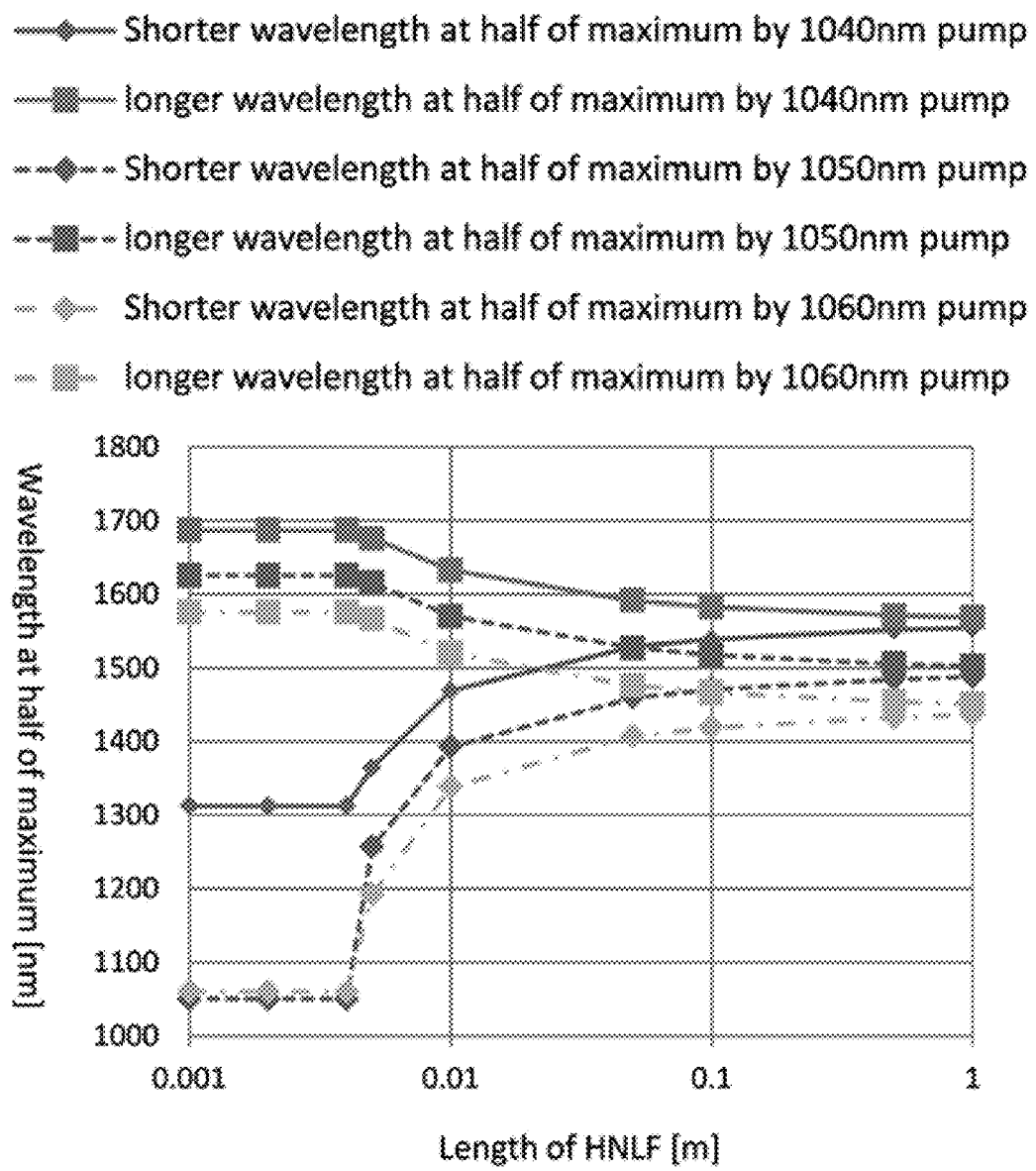

FIGS. 9A-B show the simulated results of the evolution of the gain spectrum width depending on the HNLF 114 length $L_{HNLF}$ as the wavelength of pump pulse is changed from 1040 nm to 1060 nm. As illustrated in FIG. 9A when the center wavelength of pump pulse is 1040 nm and $L_{HNLF}$ is 0.01 m the signal gain spectrum is 763 nm to 804 nm. As illustrated in FIG. 9B when the center wavelength of pump pulse is 1040 nm and $L_{HNLF}$ is 0.01 m the idler gain spectrum is 1469 nm to 1632 nm.

Fourth Exemplary Embodiment

A fourth exemplary embodiment is a specific example of the second embodiment 700 described above. In which fiber 720 is a single mode fiber (SMF) with a zero-dispersion wavelength of 1300 nm, a 3rd order dispersion of is 6.61859E-41 $s^3/m$, and 4th order dispersion is −4.59295E-56 $s^4/m$. This fiber has normal negative second order dispersion at the range of from 776 nm to 824 nm. As 8 at 1300 nm is 7,125,000 [1/m] and the length of the fiber 720 $L_{QDCF}$ is 13.52 m, the ODL 118 may be adjusted from 0 to about 4 cm for a repetition rate of 15 MHz for wavelength of 763 nm to 804 nm. The HNLF 114 is identical to the fiber used in the third exemplary embodiment. The pump pulse duration is 10 ps, the output spectral width is calculated as about 6 nm by Equations (21) and (22).

Fifth Exemplary Embodiment

A fifth exemplary embodiment is another specific example of the second embodiment 700 described above. It is similar to the fourth exemplary embodiment except that the fiber 720 is normal dispersion fiber (NDF). In this fifth exemplary embodiment, the fiber 720 has normal dispersion in the wavelength range of the idler, and is used for the oscillator at the wavelength region of idler light. The fiber 720 is a NDF fiber with a zero-dispersion wavelength of 1350 nm, a 3rd order dispersion is −2.50339E-40 $s^3/m$, and 4th order dispersion is −3.43249E-55 $s^4/m$. As $\beta_{0\_ODCF}$ at 1350 nm is 6,735,000 1/m and the length of the fiber 720 $L_{ODCF}$ is 13.8 m, the ODL 118 may be adjusted from 0 to about 4 cm for a repetition rate of 15 MHz for wavelength of 1469 nm to 1632 nm. The pump pulse duration is 10 ps, the output spectral width is calculated as about 25 nm at 1469 nm and 15 nm 1632 nm by equations (21) and (22).

Sixth Exemplary Embodiment

Figure 10:
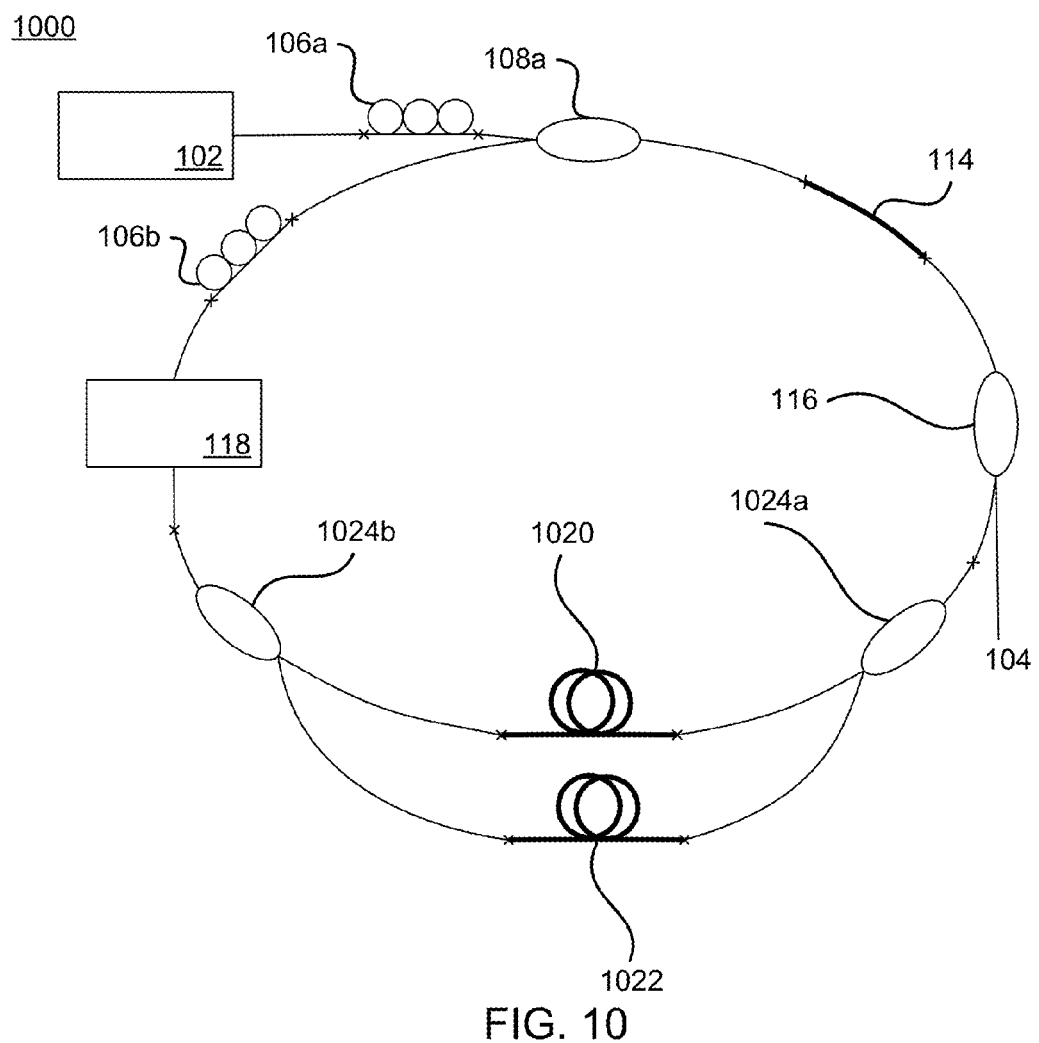
FIG. 10 is an illustration of a sixth embodiment of a FOPO.

A sixth exemplary embodiment 1000 is described with reference to FIG. 10. Configurations common to those of previous embodiments will be denoted by the same reference numerals the descriptions thereof will be omitted. Compared to previous embodiments the signal and idler pulses are divided by a fourth WDM coupler 1024a and recombined later with a fifth WDM coupler 1024b. The signal light is coupled into the SMF 1020 fiber described in the fourth embodiment and the idler light is coupled into NDF 1022 used in fifth embodiment. The fiber lengths for the SMF 1020 is 13.52 m and the NDF 1022 are 13.8 m.

Seventh Exemplary Embodiment

The seventh exemplary embodiment is another specific example of second embodiment 700 described above and is similar to the fourth exemplary embodiment except for the differences described below. The pump laser 102 is a tunable laser whose wavelength can be tuned from 1040 nm to 1060 nm. The length of the HNLF 114 is 1 m. Thus, the center wavelength is tuned from 778 nm to 835 nm, and the spectral width of the signal is changed from 3.5 nm to 5 nm. In the FOPO, the fiber 720 is SMF and the length is 12.7 m. The length of the ODL 118 is tuned from 4 cm to 6 cm.

Eighth Exemplary Embodiment

The eighth exemplary embodiment is a specific example of the second embodiment 700 described above and is similar to fifth exemplary embodiment except for the differences described below. Like the seventh exemplary embodiment, the pump laser 102 is a tunable laser whose wavelength can be tuned from 1040 nm to 1060 nm. The center wavelength of the FOPO is tuned from 1451 nm to 1568 nm, and the spectral width is changed from 14.8 nm to 13.6 nm. In the FOPO, the fiber 720 is a NDF and the length is 12.9 m. The length of the ODL is tuned from 11 cm to 14 cm.

Ninth Exemplary Embodiment

The ninth exemplary embodiment is another example of the sixth embodiment 1000 described above except for the differences described below. Like the seventh exemplary embodiment, the pump laser 102 is a tunable laser whose wavelength can be tuned from 1040 nm to 1060 nm. The fiber length for the HNLF 114 is 1 m. The fiber lengths for the SMF 1020 is 13.52 m and the NDF 1022 is 12.98 m. The length of the ODL 118 is tuned from 0 cm to 3 cm.

The second through ninth embodiments described above prevent pulse breaking based on the nonlinear effect in fiber because of dissipative soliton mode locking. Therefore, it is possible to achieve high power output based on dissipative soliton mode locking without a spectral filter. By removing the spectral filter, it can be possible to tune the wavelength only by adjusting the length of the oscillator as the wavelength tunability is kept.

Tenth Embodiment

A tenth embodiment 1100 is a wide tuning range, normal dispersion FOPO using a femtosecond, fixed wavelength fiber laser as the pump source 102. A tuning range from 1360 nm to 1835 nm with a pulse energy of up to 1.3 nJ was achieved by operating the FOPO in the normal dispersion regime. The output pulse duration reached ~200 fs after de-chirping using a few meters of standard single mode fiber (SMF-28) outside of the FOPO cavity.

Figure 11:
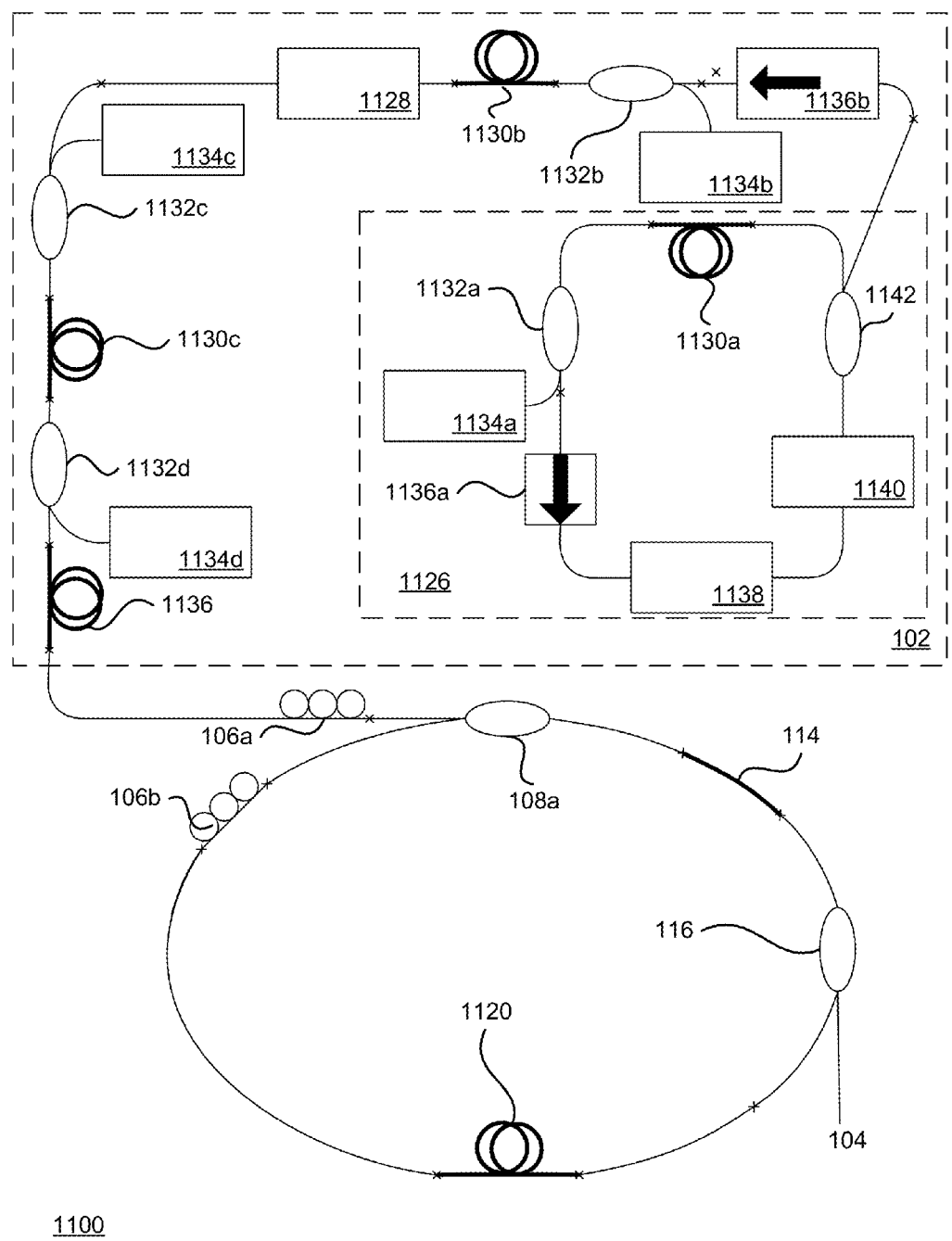
FIG. 11 is an illustration of a tenth embodiment of a FOPO.

A tenth embodiment 1100 is described with reference to FIG. 11. Configurations common to those of the previous embodiments will be denoted by the same reference numerals as those of the first exemplary embodiment and the description thereof will be omitted. FIG. 11 is a schematic diagram of the tenth embodiment which is a normal dispersion FOPO source 1100. The source 1100 can be divided into two parts, the FOPO resonating cavity, and a seed laser 102. The seed laser 102 includes an oscillator stage 1126 and one or more amplifier stages.

Oscillator

The oscillator 1126 is a tunable laser. The oscillator 1126 may be a fiber optic ring laser that includes one or more fiber optic, fused fiber, and fiber coupled micro-optic components. The oscillator 1126 may include a first linear gain medium 1130a, which may be Erbium doped fiber. The first linear gain medium 1130a may be another gain medium or fiber with another dopant. A first end of the first linear gain medium 1130a may be coupled to a first port of a first WDM coupler 1132a. The first WDM coupler 1132a may be similar or identical the WDM coupler 108b. The first WDM coupler 1132a may include a signal port and a pump port, the first WDM coupler 1132a may be operated as a multiplexer/de-multiplexer. A first pump laser 1134a is coupled to the pump port of the first WDM coupler 1132a which passes the pump light to the first port and on into the first linear gain medium 1130a which induces the first linear gain medium 1130a to emit signal light. The signal light is coupled from the first linear gain medium 1130a into the first port of the coupler 1132a. The coupler 1132a then passes the signal to the signal port. The first pump laser 1134a and the first linear gain medium 1130a may be configured in a reverse pump configuration. The first pump laser 1134a may be a 980 nm fiber coupled laser. The coupler 1132a may be a fused fiber coupler. Alternatively, the first pump laser 1134a may be a 1480 nm laser, and the first WDM coupler 1132a may be a dichroic filter based fiber-coupled micro-optic component.

The signal port of the first WDM coupler 1132a is connected to an input port of an isolator 1136a. The isolator 1136a passes the signal light to an output port of the isolator 1136a. The isolator 1136a blocks light from passing from the output port to the input port of the isolator 1136a. This ensures that the ring of the oscillator 1126 operates in a one direction. The isolator 1136a and the first WDM coupler 1132a may be combined into a single component.

The output port of the isolator 1136a is then coupled to an input of a saturable absorber 1138. Light from the saturable absorber 1138 is then coupled to an input of an optical delay line 1140. Light from the optical delay line is then coupled to an input port of a coupler 1142. The coupler 1142 is a power splitter. The power splitter 1142 splits light coupled into the input port into a second port which is coupled back into the first linear gain medium 1130a thus providing feedback for the laser cavity, and an output port which is passed on to the one or more amplifiers of the pump source 102. The power splitter 1142 may have 5%/95% splitting ratio. The power splitter 1142 may be a fused fiber optic coupler. The power splitter 1142 may be a micro optic based fiber coupler splitter. The power splitter 1142 may be optimized for the wavelength range of the oscillator.

One or more of the components described herein in the oscillator 1126 may be combined together to improve efficiency or reduce cost. The components of the oscillator may be replaced with free space optical components. The repetition rate of the oscillator 1126 is adjusted by changing the ODL 1140.

Linear Amplifier

The light exiting the oscillator 102 through the output port of the power splitter 1142 is than coupled to an input port of second isolator 1136b. The light is then passed to a signal port of a second WDM coupler 1132b. A second pump 1134b is coupled to a pump port of the second WDM coupler 1132b. The second WDM coupler 1132b multiplexes the signal light and the pump light and outputs the multiplexed light via an output port of the second WDM coupler 1132b. The output port of the WDM coupler is coupled to an input of a second linear gain medium 1130b. The second isolator blocks stimulated from the second linear gain medium 1130b from entering the oscillator 1126. The second linear gain medium amplifies the light produced by the oscillator 1126. The amplified light exiting the second linear gain medium 1130b then passed through a bandpass filter 1128. The bandpass filter 1128 may fiber coupled micro-optic filter which only lets light within the wavelength range produced by the oscillator through.

The light that has passed through the bandpass filter 1128 is coupled to a signal port of a third WDM coupler 1132c. A third pump 1134c is coupled to a pump port of the third WDM coupler 1132c. The third WDM coupler 1132c multiplexes the signal light and the pump light and outputs the multiplexed light via an output port of the third WDM coupler 1132c. The output port of the third WDM coupler 1132c is coupled to an input of a third linear gain medium 1130c. The output of the third linear gain medium 1130c is coupled to a fourth WDM coupler 1134d. A fourth pump 1134d is coupled to a pump port of the fourth WDM coupler 1134d. The fourth WDM coupler 1132d couples the amplified light from the third linear gain medium 1130c to a signal port of the fourth WDM coupler 1132d. The fourth WDM coupler 1132d also couples the pump light to the third linear gain medium.

The amplified light is then passed through a dispersion compensating fiber 1136, to modify the chirp of the seed pulse before it exits the seed laser 102 and enters the parametric amplifier.

Parametric Amplifier

The output of the seed laser is coupled to the Parametric Amplifier via a first polarization controller 106a. The first polarization controller 106a is coupled to a C/L band WDM coupler 108a. The pulse train from the seed laser is coupled into the FOPO cavity using the C/L band coupler 108a. The multiplexed port of the first WDM coupler 108a is coupled to a HNLF 114 such as DSF which is used as the parametric gain medium. The output of the HNLF 114 is coupled to an input port of a power splitter 116. A first output port of the power splitter 116 produces the output signal 104. A second output port of the power splitter 116 is coupled to an input of a dispersion management fiber 1120. The dispersion management fiber 1120 has a specific dispersion and length which is used to control the total dispersion of the optical parametric oscillator. The output of the dispersion management fiber 1120 is coupled to a second polarization controller 106b which is coupled to an L port of the C/L band coupler 108a, thus completing a resonant ring cavity for the FOPO.

A key feature of the FOPO is that the average dispersion/unit length over the entire resonating ring cavity is in the normal dispersion regime. Another feature of the FOPO is that the total length of the FOPO is constant, yet the peak output wavelength of the FOPO can be tuned by adjusting the pump laser 102.

Experimental Results

The applicants have produced experimental results based upon the tenth embodiment. The repetition rate of the seed oscillator 1126 was adjustable from ~18.8 MHz to ~19.0 MHz by using the ODL 1140. The seed oscillator 1126 delivered ~400 fs pulses at 1560 nm with an average power of ~1 mW. The amplifier was based on Er-fibers 1130b and 1130c and had 2 stages. The pulse train from the oscillator was amplified to ~20 mW in the first stage 1130b. The band-pass filter 1128 had a bandwidth of 1 nm centered at 1560 nm and was used to avoid excessive nonlinear spectral broadening and ASE noise. At the output of the seed laser 102, the signal was boosted to ~180 mW. The pump pulse duration at the input of the FOPO was estimated to be around 5 ps and the pulses were highly chirped. The HNLF was 1.5 m long. The power splitter 116 was a 90/10% fused fiber output coupler. The dispersion management fiber 1120 was 7.5 m of DCF-38.

Figure 17:
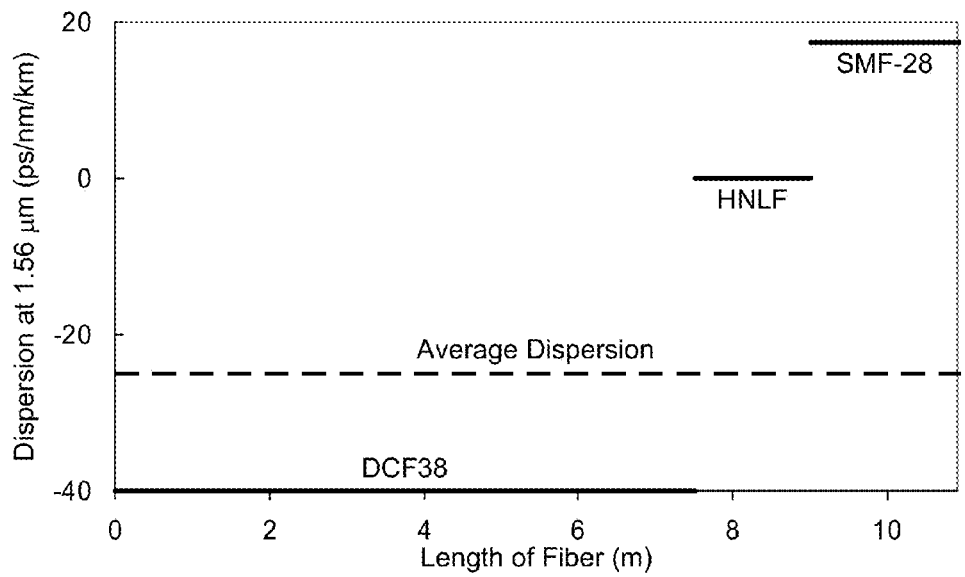
FIG. 17 is an illustration of dispersions of fibers used in the FOPO.

The dispersions at 1560 nm of fibers used in the FOPO are illustrated in FIG. 17. Owing to the relatively long length of the dispersion compensating fiber (DCF-38) 1120 used in the cavity, the average dispersion of the ring cavity is ~−25 ps/nm/km. This normal dispersion will enable dissipative solitons to form inside the FOPO cavity. By adjusting the cavity length of the seed oscillator to match the cavity length of the FOPO, parametric oscillation was observed at pump powers >40 mW.

Figure 12A:
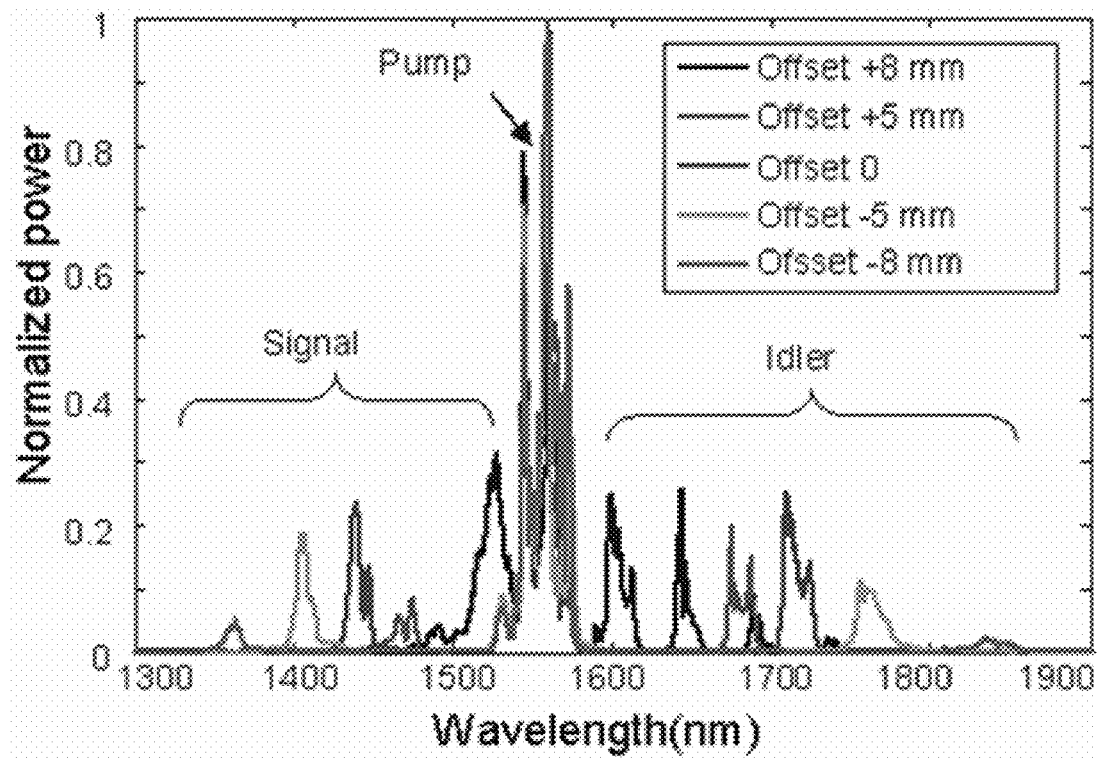
FIGS. 12A-C are illustrations of experimental results.
Figure 12B:
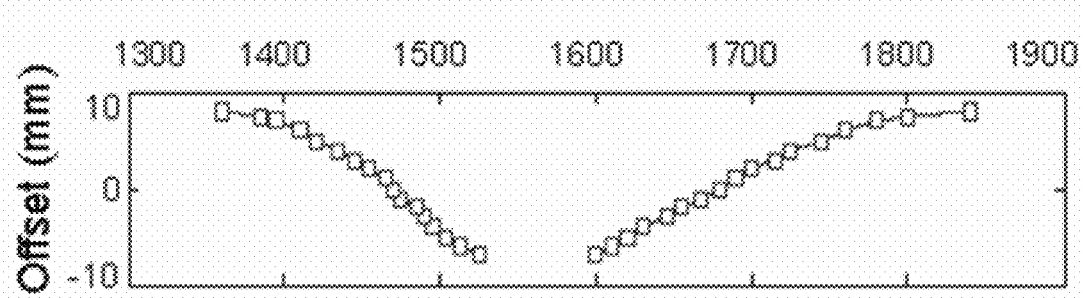
Figure 12C:
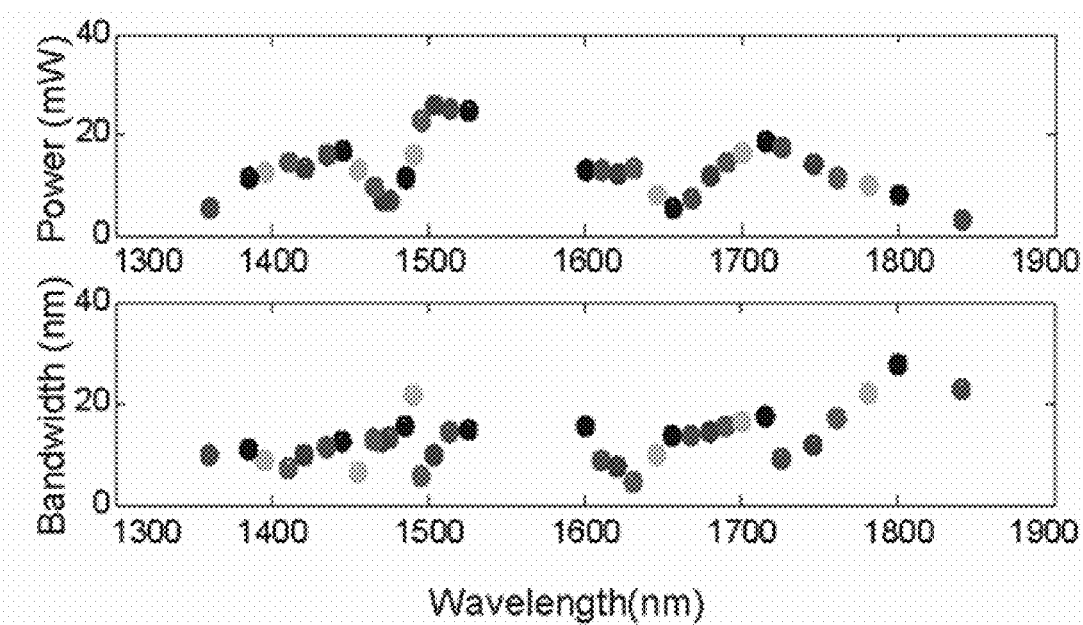

An optical spectrum analyzer was used to record the output spectrum from the FOPO as the cavity length of the seed oscillator was tuned with the ODL 1140. The measured spectra for some of the offsets is shown in FIG. 12A. The peak wavelength for the signal and idler spectra as a function of the offset of the ODL 1140 is illustrated in FIG. 12B. FIG. 12C are illustrations of the power and bandwidth of signal and idler produced by the FOPO.

The applicants observed that the pump at 1560 nm has transferred its energy to two symmetric sidebands (signal and idler) on both side of the pump wavelength. Note that when the generated waves were not far from the pump, additional four wave mixing (FWM) effects occur which generated several higher order of FWM peaks. We obtained ~400 nm total tuning range (by cavity length adjustment over 16 mm) with a wavelength span of 475 nm (from 1360 nm to 1835 nm). The maximum output pulse energy was ~1.3 nJ.

Eleventh Exemplary Embodiment

Figure 13:
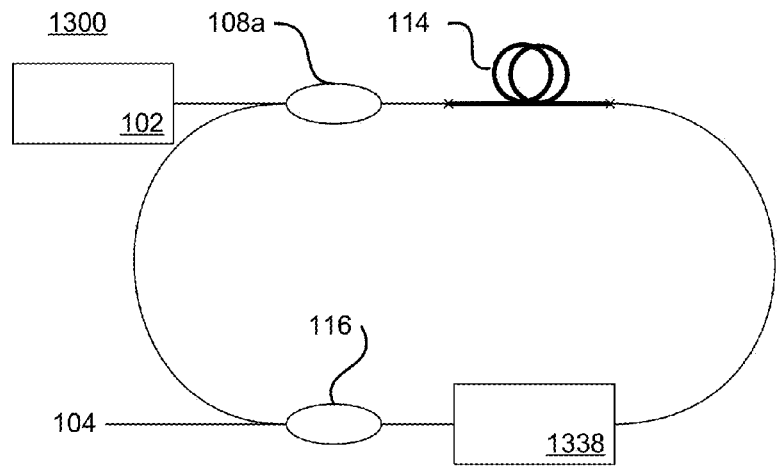
FIG. 13 is an illustration of an eleventh embodiment of a FOPO.

A eleventh exemplary embodiment 1300 is described with reference to FIG. 13. Configurations common to those of the previous embodiments will be denoted by the same reference numerals as those of the first exemplary embodiment and the description thereof will be omitted. The eleventh exemplary embodiment 1300 includes a pump laser 102 and a FOPO. The peak output 104 is controlled by adjusting the repetition rate of the pump laser 102. The repetition rate of seed laser 102 is controllable. The repetition rate controllable seed laser 102 may be an active mode-locked laser, an active Q-switched laser, a pulse laser generated from a continuous wave (CW) laser by intensity modulation, or a pulse laser generated from CW laser by phase modulation.

The pump laser 102 is coupled to a first input port of the WDM 108a. The WDM 108a passes the pump light to an output port of the WDM 108a. The output port of the WDM 108a is coupled to an input of the HNLF 114. The HNLF provides parametric gain. The output of the HNLF 114 is coupled to an input port of a filter 1338. The output of the filter 1338 is coupled to an input port of the power splitter 116. A first output of the power splitter 116 provides the output signal 104. A second output of the power splitter 116 is coupled to a second input port of the WDM 108a which is mixed with the pump signal and sent out of the WDM 108a to provide feedback for the FOPO.

In a specific example of the eleventh embodiment an output wavelength of the seed laser 102 may be stable at 1550 nm. The repetition rate of the seed laser 102 may be tuned from 15.363 MHz to 15.366 MHz. Output from the seed laser is coupled into a fiber optical parametric oscillator (FOPO) via WDM coupler 108a. The FOPO resonating cavity includes: 10 m SMF with a 0 dispersion and 0.092 ps/$^2$ km dispersion slope at 1310 nm; and 5 m HNLF 114 with 0 dispersion and 0.07 ps/nm$^2$/km dispersion slope at 1548 nm. The total dispersion in this FOPO resonating cavity is in the anomalous dispersion region. Thus, the round trip frequency at 1580 nm and 1620 nm are 15.366 MHz and 15.363 MHz, respectively.

In the HNLF 114, parametric processes occur and the signal light and idler light are generated. After that, the signal and pump lights are cut off by the filter 1338, which in this case may be a long pass filter. Then, the power splitter 116 sends 90% of idler light to the output 104 and 10% of idler light is returned to the FOPO and overlapped with next seed laser pulse.

Figure 14A:
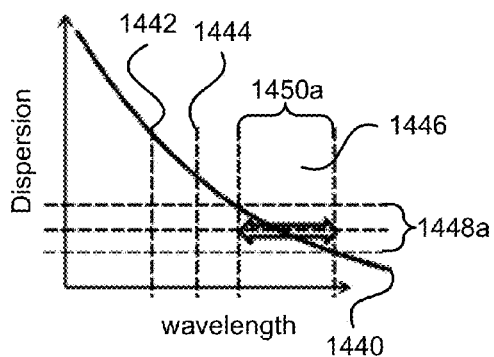
FIGS. 14A-D are illustrations of tuning ranges.

The advantages of this example are high speed wavelength tuning and no free space alignment at the wavelength region of the idler. In addition, since the oscillated pulse is operated in soliton regime, the pulse shape can be sech$^2$ like. FIG. 14A is an illustration of the tuning range in which the filter 1338 is a long pass filter in which the total dispersion of the FOPO 1440 is plotted vs the .wavelength. The signal wavelength is area by dashed line 1442. The pump wavelength is shown by dashed line 1444. The idler wavelength is within the area 1446. The repetition rate of the seed laser 102 maps to the dispersion range 1448a, which coincides with a wavelength range represented by range 1450a. The mapping between repetition rate and wavelength of the idler is controlled by the dispersion curve 1440.

Twelfth Exemplary Embodiment

A twelfth exemplary embodiment is another specific example of the eleventh exemplary embodiment 1300 described above. An output wavelength of the seed laser 102 may be stable at 1550 nm. The repetition rate of the seed laser 102 may be tuned from 15.368 MHz to 15.369 MHz. Output from the seed laser is coupled into a fiber optical parametric oscillator (FOPO) via WDM coupler 108a. The FOPO resonating cavity includes: 10 m single mode fiber (SMF) with 0 dispersion and 0.092 ps/nm$^2$/km dispersion slope at 1310 nm; and 5 m HNLF with 0 dispersion and 0.07 ps/nm$^2$/km dispersion slope at 1548 nm. The total dispersion in this FOPO resonating cavity is in the anomalous dispersion region. Thus, the round trip frequency at 1580 nm and 1620 nm are 15.369 MHz and 15.368 MHz, respectively.

In the HNLF 114, parametric processes occur and the signal light and idler light are generated. After that, the idler light and pump light are cut off by the filter 1338, which in this case may be a short pass filter. Then, the power splitter 116 sends 90% of idler light to the output 104 and 10% of idler light is returned to the FOPO and overlapped with next seed laser pulse.

Figure 14B:
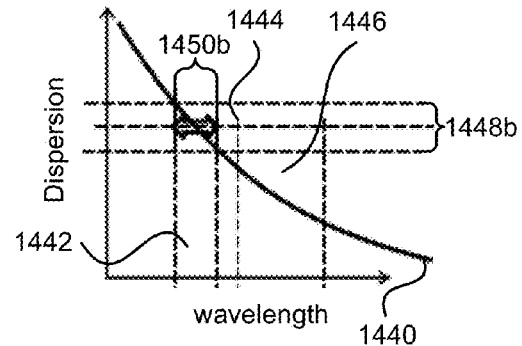

FIG. 14B is an illustration of the tuning range in which the filter 1338 is a long pass filter in which the total dispersion of the FOPO 1440 is plotted vs the .wavelength. The signal wavelength is area by dashed line 1442. The pump wavelength is shown by dashed line 1444. The idler wavelength is within the area 1446. The repetition rate of the seed laser 102 maps to the dispersion range 1448b. Which coincides with a wavelength range represented by range 1450b. The mapping between repetition rate and wavelength of the idler is controlled by the dispersion curve 1440.

Thirteenth Exemplary Embodiment

Figure 15:
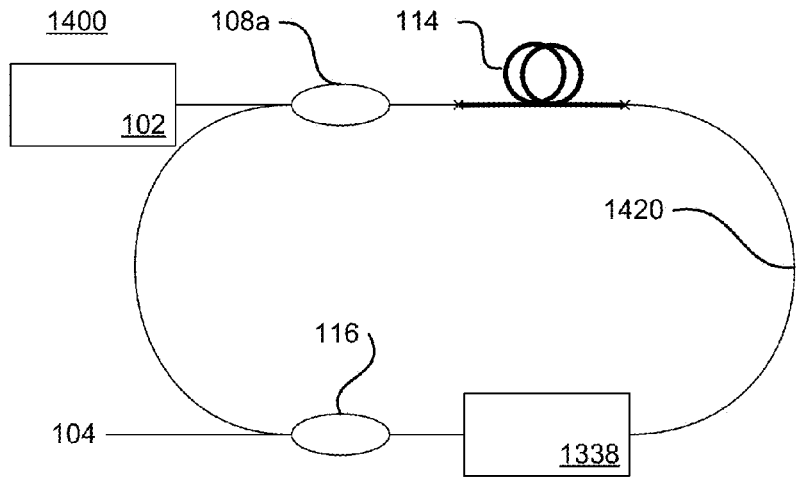
FIG. 15 is an illustration of an thirteenth embodiment of a FOPO.

A thirteenth exemplary embodiment 1400 is described with reference to FIG. 15. Configurations common to those of the previous embodiments will be denoted by the same reference numerals as those of the first exemplary embodiment and the description thereof will be omitted. This configuration is identical to the eleventh exemplary embodiment illustrated in FIG. 13, except that DCF 1520 is between the HNLF 114 and the filter 1338.

In a specific example of the thirteenth exemplary embodiment an output wavelength of the seed laser 102 may be stable at 1550 nm. The repetition rate of the seed laser 102 may be tuned from 15.525 MHz to 15.529 MHz. Output from the seed laser is coupled into a fiber optical parametric oscillator (FOPO) via WDM coupler 108a. The FOPO resonating cavity includes: 10 m dispersion compensating fiber (DCF) with ~40 ps/nm/km dispersion and −0.1 ps/nm$^2$/km dispersion slope at 1550 nm; 5 m highly nonlinear fiber (HNF) with 0 dispersion and 0.07 ps/nm$^2$/km dispersion slope at 1548 nm. The total dispersion in this FOPO resonating cavity is in the normal dispersion region. Thus, the round trip frequency at 1580 nm and 1620 nm are 15.525 MHz and 15.529 MHz, respectively.

In the HNLF 114, parametric processes occur and the signal light and idler light are generated. After that, the signal and pump lights are cut off by the filter 1338, which in this case may be a long pass filter. Then, the power splitter 116 sends 90% of idler light to the output 104 and 10% of idler light is returned to the FOPO and overlapped with next seed laser pulse.

Figure 16A:
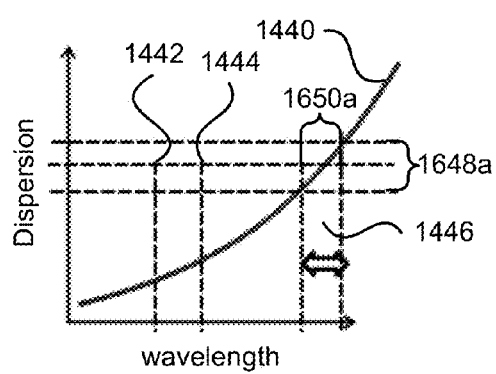

The advantages of this example are high speed wavelength tuning and no free space alignment at the wavelength region of the Idler. In addition, since the oscillated pulse is operated in the dissipative soliton regime, the pulse energy can be higher than the pulse generated in the soliton regime. FIG. 16A is an illustration of the tuning range in which the filter 1338 is a long pass filter in which the total dispersion of the FOPO 1440 is plotted vs the wavelength. The signal wavelength is the area by dashed line 1442. The pump wavelength is shown by dashed line 1444. The idler wavelength is within the area 1446. The repetition rate of the seed laser 102 maps to the dispersion range 1648a, which coincides with a wavelength range represented by range 1650a. The mapping between repetition rate and wavelength of the idler is controlled by the dispersion curve 1440.

Fourteenth Exemplary Embodiment

A twelfth exemplary embodiment is another specific example of the eleventh exemplary embodiment 1300 described above. An output wavelength of the seed laser 102 may be stable at 1550 nm. The repetition rate of the seed laser 102 may be tuned from 15.519 MHz to 15.521 MHz. Output from the seed laser is coupled into a fiber optical parametric oscillator (FOPO) via WDM coupler 108a. The FOPO resonating cavity includes: 10 m DCF with −40 ps/nm/km dispersion and 0.07 ps/nm$^2$/km dispersion slope at 1310 nm; and 5 m HNLF with 0 dispersion and 0.07 ps/nm$^2$/km dispersion slope at 1548 nm. The total dispersion in this FOPO resonating cavity is in the normal dispersion region. Thus, the round trip frequency at 1520 nm and 1540 nm are 15.519 MHz and 15.521 MHz, respectively.

In the HNLF 114, parametric processes occur and the signal light and idler light are generated. After that, the idler light and pump light are cut off by the filter 1338, which in this case may be a short pass filter. Then, the power splitter 116 sends 90% of idler light to the output 104 and 10% of idler light is returned to the FOPO and overlapped with next seed laser pulse.

Figure 16B:
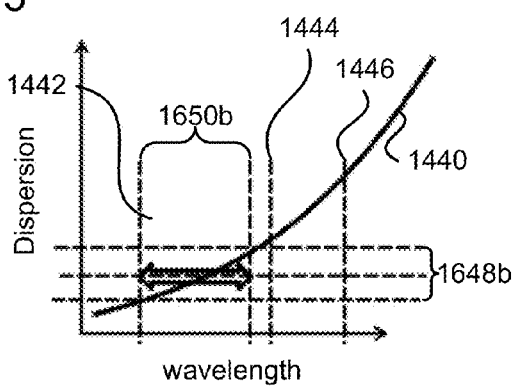

FIG. 16B is an illustration of the tuning range in which the filter 1338 is a long pass filter in which the total dispersion of the FOPO 1440 is plotted vs the wavelength. The signal wavelength is in the region 1442. The pump wavelength is shown by dashed line 1444. The idler wavelength is shown by dashed line 1446. The repetition rate of the seed laser 102 maps to the dispersion range 1648b, which coincides with a wavelength range represented by range 1650b. The mapping between repetition rate and wavelength of the idler is controlled by the dispersion curve 1440.

Fifteenth Exemplary Embodiment

A fifteenth exemplary embodiment is a variation on the specific example of the eleventh exemplary embodiment 1300 described above, which is described with reference to FIG. 15. An output wavelength of the seed laser 102 may be stable at 1550 nm. The repetition rate of the seed laser 102 may be tuned from 44.4983 MHz to 44.499 MHz. Output from the seed laser is coupled into a fiber optical parametric oscillator (FOPO) via WDM coupler 108a. The FOPO resonating cavity includes: 0.18 m DCF 1420 with −40 ps/nm/km dispersion and −0.1 ps/nm$^2$/km dispersion slope at 1550 nm; and 5 m HNLF with 0 dispersion and 0.07 ps/nm$^2$/km dispersion slope at 1548 nm. The total dispersion in this FOPO resonating cavity is in the normal dispersion region at wavelengths shorter than 1550 nm and anomalous dispersion in the wavelength region greater than 1550 nm. Thus, the round trip frequency at 1520 nm and 1540 nm are 44.5407 MHz and 44.5412 MHz, respectively. In addition, the round trip frequency at 1580 nm and 1620 nm are 44.5414 MHz and 44.5406 MHz, respectively.

In the HNLF 114, parametric processes occur and the signal light and idler light are generated. After that, the idler light and pump light are cut off by the filter 1338, which in this case may be a short pass filter. Then, the power splitter 116 sends 90% of idler light to the output 104 and 10% of idler light is returned to the FOPO and overlapped with next seed laser pulse.

Figure 16C:
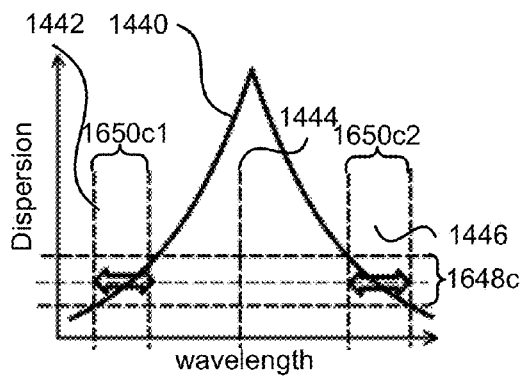

FIG. 16C is an illustration of the tuning range in which the filter 1338 is a band cut filter in which the total dispersion of the FOPO 1440 is plotted vs the wavelength in which the dispersion is normal for the signal and anomalous for the idler. The signal wavelength is in the region 1442. The pump wavelength is shown by dashed line 1444. The idler wavelength is in area 1446. The repetition rate of the seed laser 102 maps to the dispersion range 1648b, which coincides with a wavelength ranges 1650c1 and 1650c2. The mapping between repetition rate and wavelength of the idler is controlled by the dispersion curve 1440.

Sixteenth Exemplary Embodiment

A sixteenth exemplary embodiment is another specific example of the eleventh exemplary embodiment 1300 described above in which the seed laser is a tunable pulse laser with an adjustable repetition rate. The oscillator of the seed laser 102 may include a 15.005 m of large mode area fiber (LMAF) and a semiconductor optical amplified (SOA). The LMAF may have 38.25 ps/nm/km dispersion and 0.0733 ps/nm$^2$/km dispersion slope at the wavelength of 1550 nm. The SOA is driven by a modulated current. The seed laser 102 may be tuned from 1555-1560 nm. The repetition rate of the seed laser 102 may be tuned from 15.367 MHz to 15.362 MHz. Output from the seed laser is coupled into a fiber optical parametric oscillator (FOPO) via WDM coupler 108a. The FOPO resonating cavity includes: 10 m SMF with a 0 dispersion and 0.092 ps/² km dispersion slope at 1310 nm; and 5 m HNLF 114 with 0 dispersion and 0.07 ps/nm²/km dispersion slope at 1548 nm. The total dispersion in this FOPO resonating cavity is in the anomalous dispersion region. Thus, the round trip frequency at 1580 nm and 1620 nm are 15.366 MHz and 15.363 MHz, respectively. By synchronizing the repetition rates of seed oscillator and parametric oscillator, the wavelength tunable range will be expanded.

In the HNLF 114, parametric processes occur and the signal light and idler light are generated. After that, the signal and pump lights are cut off by the filter 1338, which in this case may be a long pass filter. Then, the power splitter 116 sends 90% of idler light to the output 104 and 10% of idler light is returned to the FOPO and overlapped with next seed laser pulse.

Figure 14C:
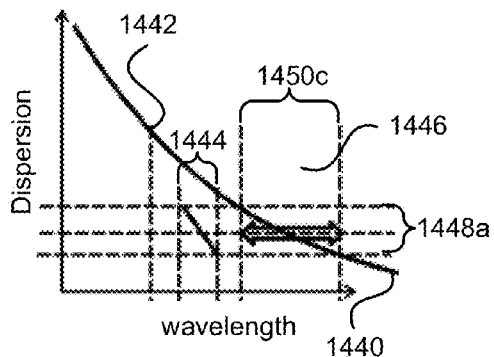

The advantages of this example are high speed wavelength tuning and no free space alignment at the wavelength region of the idler. Moreover, since the seed pulse at shorter wavelengths generates gain at longer wavelengths in the idler region, a fluctuation in the power of the seed oscillator, can be reduced. In addition, since the oscillated pulse is operated in soliton regime, the pulse shape can be sech² like. FIG. 14C is an illustration of the tuning range in which the filter 1338 is a long pass filter and the seed laser is tunable in which the total dispersion of the FOPO 1440 is plotted vs the .wavelength. The signal wavelength is area by dashed line 1442. The pump wavelength is shown by the region 1444. The idler wavelength is within the area 1446. The repetition rate of the seed laser 102 maps to the dispersion range 1448c, which coincides with a wavelength range represented by range 1450c. The mapping between repetition rate and wavelength of the idler is controlled by the dispersion curve 1440. The tuning of the seed laser 102 expands the wavelength range 1450c. As the wavelength of pump laser is adjusted, the dispersion in the pump laser wavelength region is important, the relationship between the repetition rate pump and idler (or signal) is expands or suppresses the wavelength tunable range of FOPO.

Seventeenth Exemplary Embodiment

A seventeenth exemplary embodiment is another specific example of the eleventh exemplary embodiment 1300 described above, it is substantially similar to the sixteenth embodiment except that the idler light and pump light are cut off by the filter 1338, which in this case may be a short pass filter instead of a long pass filter. Also, the repetition rate of the seed laser 102 may be tuned from 15.372 MHz to 15.367 MHz. The round trip frequency at 1520 nm and 1540 nm are 15.369 MHz and 15.368 MHz, respectively.

Figure 14D:
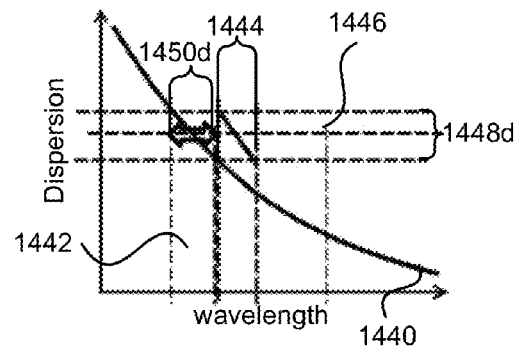

FIG. 14D is an illustration of the tuning range in which the filter 1338 is a short pass filter in which the total dispersion of the FOPO 1440 is plotted vs the .wavelength and the seed laser is tunable. The signal wavelength is area 1442. The pump wavelength is shown by area 1444. The idler wavelength is within the area 1446. The repetition rate of the seed laser 102 maps to the dispersion range 1448d, which coincides with a wavelength range represented by range 1450d. The mapping between repetition rate and wavelength of the idler is controlled by the dispersion curve 1440. The tunable range of the idler 1450d is increased by tuning the wavelength and repetition rate of the seed laser 102. It is important to tune both the repetition rate and wavelength of the seed laser, in order to expand the tuning range of FOPO.

Eighteenth Exemplary Embodiment

The eighteenth exemplary embodiment is substantially similar to the thirteenth exemplary embodiment except that it replaces the stable seed laser 102 with a tunable seed laser 102 similar to the one described in sixteenth embodiment. The oscillator of the seed laser 102 may include 14.848 m LMAF. The repetition rate of the seed laser 102 may be tuned from 15.529 MHz to 15.524 MHz depending on the wavelength.

Figure 16D:
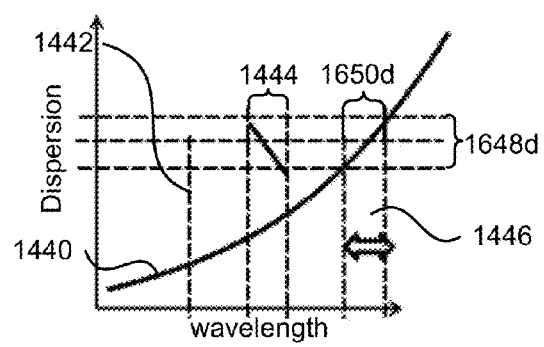

The eighteenth exemplary embodiment includes a FOPO with the same fibers as the specific example of the thirteenth exemplary embodiment. FIG. 16D is an illustration of the tuning range in which the filter 1338 is a long pass filter in which the total dispersion of the FOPO 1440 is plotted vs the wavelength and the seed laser 102 is tunable. The signal wavelength is the area by the dashed line 1442. The pump wavelength is in the range 1444. The idler wavelength is within the area 1446. The repetition rate of the seed laser 102 maps to the dispersion range 1648d, which coincides with a wavelength range represented by range 1650d. The mapping between repetition rate and wavelength of the idler is controlled by the dispersion curve 1440. The range 1650d is expanded by changing the wavelength and repetition rate of the seed laser 102. It is important to tune both the repetition rate and wavelength of seed laser, in order to expand the tuning range of FOPO.

Nineteenth Exemplary Embodiment

The nineteenth exemplary embodiment is substantially similar to the fourteenth exemplary embodiment except that it replaces the stable seed laser 102 with a tunable seed laser 102 similar to the one described in sixteen embodiment. The oscillator of the seed laser 102 may include 14.855 m LMAF. The repetition rate of the seed laser 102 may be tuned from 15.522 MHz to 15.517 MHz depending on the wavelength. The round trip frequency at 1520 nm and 1540 nm are 15.519 MHz and 15.521 MHz, respectively.

The nineteenth exemplary embodiment includes a FOPO with the same fibers as the specific example of the thirteenth exemplary embodiment. FIG. 16E is an illustration of the tuning range in which the filter 1338 is a short pass filter in which the total dispersion of the FOPO 1440 is plotted vs the wavelength and the seed laser 102 is tunable. The signal wavelength is the area by the dashed line 1442. The pump wavelength is in the range 1444. The idler wavelength is within the area 1446. The repetition rate of the seed laser 102 maps to the dispersion range 1648e, which coincides with a wavelength range represented by range 1650e. The mapping between repetition rate and wavelength of the idler is controlled by the dispersion curve 1440. The range 1650d is expanded by changing the wavelength and repetition rate of the seed laser 102. It is important to tune both of the repetition rate and wavelength of seed laser, in order to expand the tuning range of FOPO.

Twentieth Exemplary Embodiment

The twentieth exemplary embodiment is substantially similar to the fifteenth exemplary embodiment except that it replaces the stable seed laser 102 with a tunable seed laser 102 similar to the one described in sixteenth embodiment. The oscillator of the seed laser 102 may include 5.175 m of LMAF. The repetition rate of the seed laser 102 may be tuned from 44.552 MHz to 44.537 MHz depending on the wavelength.

FIG. 16F is an illustration of the tuning range in which the filter 1338 is a band cut filter in which the total dispersion of the FOPO 1440 is plotted vs the .wavelength in which the dispersion is normal for the pump and anomalous for the idler. The signal wavelength is in the region 1442. The pump wavelength is in the region 1444. The idler wavelength is in area 1446. The repetition rate of the seed laser 102 maps to the dispersion range 1648f, which coincides with a wavelength ranges 1650/1 and 1650/2. The mapping between repetition rate and wavelength of the idler is controlled by the dispersion curve 1440.

Twenty First Exemplary Embodiment

The twenty first exemplary embodiment is substantially similar to the sixteenth exemplary embodiment. Except for the oscillator of the seed laser 102 includes 15.228 m of DCF with −40 ps/nm/km dispersion and −0.1 ps/nm$^2$/km dispersion slope at 1550 nm. The wavelength is tuned from 1550 nm to 1565 nm and the repetition rate is changed from 15.3634 MHz to 15.3657 MHz depending on the wavelength. The dispersion for the pump is in the normal dispersion regime while the dispersion of the idler is in the anomalous dispersion regime. The total dispersion of the FOPO is anomalous. The output of the wavelength of the FOPO may be tuned by adjusting the wavelength of the pump and the repetition rate of the pump.

Twenty Second Exemplary Embodiment

The twenty second exemplary embodiment is substantially similar to the seventeenth exemplary embodiment except that the oscillator of the seed laser is similar to oscillator used in twenty first exemplary embodiment except that 15.224 m of the same DCF is used and the repetition rate is changed from 15.3682 MHz to 15.3689 MHz depending on the wavelength. The dispersion for the pump is in the normal dispersion regime while the dispersion of the signal is in the anomalous dispersion regime. The total dispersion of the FOPO is anomalous. The output of the wavelength of the FOPO may be tuned by adjusting the wavelength of the pump and the repetition rate of the pump.

Twenty Third Exemplary Embodiment

The twenty third exemplary embodiment is substantially similar to the eighteenth exemplary embodiment except that the oscillator of the seed laser is similar to oscillator used in twenty first exemplary embodiment except that 15.069 m of the same DCF is used and the repetition rate is changed from 15.5255 MHz to 15.5278 MHz depending on the wavelength. The dispersion for the pump and idler are in the normal dispersion regime. The total dispersion of the FOPO is normal. As the wavelength of pump laser is tuned the dispersion in tuned pump laser wavelength region is important and the relationship between the repetition rate pump and idler (or signal) is important to expand or suppress the wavelength tunable range of FOPO. The output of the wavelength of the FOPO may be tuned by adjusting the wavelength of the pump and the repetition rate of the pump.

Twenty Fourth Exemplary Embodiment

The twenty fourth exemplary embodiment is substantially similar to the nineteenth exemplary embodiment except that the oscillator of the seed laser is similar to the oscillator used in the twenty first exemplary embodiment except that 15.076 m of the same DCF is used and the repetition rate is changed from 15.5814 MHz to 15.5206 MHz depending on the wavelength. The dispersion for the pump and signal are in the normal dispersion regime. As the wavelength of pump laser is tuned, the dispersion in pump laser wavelength region is important to the tunability of the FOPO. The total dispersion of the FOPO is normal. The output of the wavelength of the FOPO may be tuned by adjusting the wavelength of the pump and the repetition rate of the pump. The seed laser is same as Example 11. The oscillator of the seed laser is consisted of 15.076 m dispersion compensating fiber (DCF) with −40 ps/nm/km dispersion and −0.1 ps/nm$^2$/km dispersion slope at 1550 nm and SOA. The wavelength is tuned from 1550 nm to 1565 nm and the repetition rate is changed from 15.5184 MHz to 15.5206 MHz depending on the wavelength.

Twenty Fifth Exemplary Embodiment

The twenty fifth exemplary embodiment is substantially similar to the twentieth exemplary embodiment except that the oscillator of the seed laser is similar to the oscillator used in the twenty first exemplary embodiment except that 5.253 m of the same DCF is used and the repetition rate is changed from 44.5394 MHz to 44.5416 MHz depending on the wavelength. The dispersion for the pump and signal are normal, while the dispersion for idler is anomalous. The output of the wavelength of the FOPO may be tuned by adjusting the wavelength of the pump and the repetition rate of the pump.

Output from the seed laser is coupled into a fiber optical parametric oscillator (FOPO). Since the FOPO is consisted of 0.18 m dispersion compensating fiber (DCF) with −40 ps/nm/km dispersion and −0.1 ps/nm$^2$/km dispersion slope at 1550 nm, 5 m highly nonlinear fiber (HNF) with 0 dispersion and 0.07 ps/nm$^2$/km dispersion slope at 1548 nm, total dispersion in this FOPO is normal dispersion at the wavelength range of shorter 1550 nm and anomalous dispersion at the wavelength range longer than 1550 nm. Thus, round trip frequency at 1520 nm and 1540 nm are 44.5407 MHz and 44.5412 MHz, respectively. On the other hand, round trip frequency at 1580 nm and 1620 nm are 44.5414 MHz and 44.5406 MHz, respectively.

What is claimed is:

1. A fiber optic parametric amplifier comprising:
   an input port for receiving an optical pump pulse, with a first pulse duration, at a pump wavelength;
   a resonating cavity comprising:
   a first coupler for coupling the optical pump pulse into the resonating cavity;
   a linear fiber optic gain medium, with negative chromatic dispersion, that increases the intensity of the pump pulse and increases the first pump pulse duration to a second pump pulse duration after exiting the linear fiber optic gain medium;
   a nonlinear fiber optic gain medium with positive chromatic dispersion, that provides parametric gain to light which exits the linear fiber optic gain medium, the nonlinear optical gain medium transfers energy from the pump pulse after exiting the linear optical gain medium to a signal pulse with a first signal pulse duration after exiting the nonlinear fiber optic gain medium;
   a power splitter that receives light that exits the nonlinear fiber optic gain medium and provides:
   a first portion of the light that exits the nonlinear fiber optic gain medium to an output port to exit the resonating cavity; and
   a second portion of the light that exits the nonlinear fiber optic gain medium is fed back into the resonating cavity so that it passes through the linear fiber optic gain medium;

wherein the linear fiber optic gain medium increases the pulse duration of the signal pulse with a first pulse duration to a second signal pulse duration after exiting the linear fiber optic gain medium.

2. The fiber optic parametric amplifier of claim 1, wherein the average chromatic dispersion of the resonating cavity is within the normal dispersion range.

3. The fiber optic parametric amplifier of claim 1, wherein the second portion of the light that exits the nonlinear fiber optic gain medium that is provided by the power splitter is fed back into the resonating cavity via the first coupler.

4. The fiber optic parametric amplifier of claim 1, further comprising a seed laser for providing the optical pump pulse.

5. The fiber optic parametric amplifier of claim 1, wherein the resonating cavity further comprises an optical delay line.

6. The fiber optic parametric amplifier of claim 1, wherein the linear gain medium is an Erbium doped fiber optic amplifier.

7. The fiber optic parametric amplifier of claim 1, wherein the resonating cavity further comprises a non-gain fiber that does not provide optical gain and has a chromatic dispersion that has a chromatic dispersion that is greater than the chromatic dispersion of the nonlinear fiber optic gain medium.

8. The fiber optic parametric amplifier of claim 1, wherein a peak wavelength of the light that exits the output port is changed by changing a repetition rate of the pump pulse.

9. The fiber optic parametric amplifier of claim 1, wherein the resonating cavity further comprises:
a first wavelength division multiplexer for splitting the light in the resonating cavity into signal light and idler light, wherein the signal light has a first wavelength range that includes the signal pulse and the idler wavelength has a second wavelength range different from the first wavelength range;
a second wavelength division multiplexer for combining the signal light and the idler light, wherein the combined light travels back through the resonating cavity together;
a first fiber coupling the signal from the first wavelength division multiplexer to the second wavelength division multiplexer; and
a second fiber coupling the signal from the first wavelength division multiplexer to the second wavelength division multiplexer.

10. The fiber optic parametric amplifier of claim 9, wherein the length of the first fiber is different from the length of the second fiber.

11. The fiber optic parametric amplifier of claim 9, wherein a material property of the first fiber is different from a material property of the second fiber.

12. The fiber optic parametric amplifier of claim 1, wherein a peak wavelength of the light that exits the output port is changed by changing at least two properties of the pump pulse selected from the group consisting of: repetition rate of the pump pulse; center wavelength of the pump pulse; peak power of the pump pulse; repetition frequency of the pump pulse.

13. The fiber optic parametric amplifier of claim 1, wherein the signal pulse is a soliton and pulse breaking is prevented by dissipative soliton mode locking in the resonating cavity.

14. The fiber optic parametric amplifier of claim 13, wherein the peak wavelength of the light that exits the output port is changed by changing the length of the resonating cavity and the there is no spectral filter within the resonating cavity.

15. A fiber optic parametric amplifier comprising:
an input port for receiving an optical pump pulse light at a pump wavelength;
a resonating cavity comprising:
a first coupler for coupling the optical pump pulse light into an resonating cavity;
a nonlinear fiber optic gain medium that transfers energy from the pump pulse light to a first pulse light having a first wavelength range which does not include the pump wavelength;
a power splitter that receives light that exits the nonlinear fiber optic gain medium and provides:
a first portion of the light that exits the nonlinear fiber optic gain medium to an output port to exit the resonating cavity; and
a second portion of the light that exits the nonlinear fiber optic gain medium is fed back into the resonating cavity;
wherein the average chromatic dispersion of the resonating cavity is not 0 dispersion at the first wavelength range.

16. The fiber optic parametric amplifier of claim 15, wherein the second portion of the light that exits the nonlinear fiber optic gain medium that is provided by the power splitter is fed back into the resonating cavity via the first coupler.

17. The fiber optic parametric amplifier of claim 15, wherein the average chromatic dispersion of the resonating cavity is within a normal dispersion range at the first wavelength range.

18. The fiber optic parametric amplifier of claim 15, wherein the average chromatic dispersion of the resonating cavity is within the anomalous dispersion range at the first wavelength range.

19. The fiber optic parametric amplifier of claim 15, wherein a nonlinear fiber optic gain medium that transfers energy from the pump pulse light to the first pulse light and a second pulse light having a second wavelength range which does not include the pump wavelength and is not the first wavelength range.

20. The fiber optic parametric amplifier of claim 19, wherein the average chromatic dispersion of the resonating cavity is not 0 dispersion at the second wavelength range.

21. The fiber optic parametric amplifier of claim 20, wherein the average chromatic dispersion of the resonating cavity is within a normal dispersion range at the first wavelength range and at the second wavelength range.

22. The fiber optic parametric amplifier of claim 20, wherein
the average chromatic dispersion of the resonating cavity is within an anomalous dispersion range at the first wavelength range and
the average chromatic dispersion of the resonating cavity is within a normal dispersion range at the second wavelength range.

23. The fiber optic parametric amplifier of claim 15, further comprising an optical delay line.

24. The fiber optic parametric amplifier of claim 23, wherein the optical delay line is configured to change a peak wavelength of light that exits the output port by changing a length of the optical delay line.

25. The fiber optic parametric amplifier of claim 15, further comprising a seed laser for providing the optical pump pulse.

26. The fiber optic parametric amplifier of claim 25, wherein the seed laser is configured to change a peak wavelength of light that exits the output port by changing a repetition rate of the optical pump pulse.

27. The fiber optic parametric amplifier of claim 25, wherein the seed laser is tunable laser.

28. The fiber optic parametric amplifier of claim 25, wherein
the seed laser is tunable laser and
the seed laser is configured to change a peak wavelength of light that exits the output port by changing a repetition rate of the optical pump pulse and by changing a wavelength of the seed laser.

29. The fiber optic parametric amplifier of claim 15, wherein the first coupler comprises a wavelength division multiplexer.

30. The fiber optic parametric amplifier of claim 19, further comprising:
a first wavelength division multiplexer for splitting the light in the resonating cavity into the first pulse light and the second pulse light;
a second wavelength division multiplexer for combining the first pulse light and the second pulse light, wherein the combined light travels back through the resonating cavity together;
a first fiber coupling the first pulse light from the first wavelength division multiplexer to the second wavelength division multiplexer; and
a second fiber coupling the second pulse light from the first wavelength division multiplexer to the second wavelength division multiplexer.

31. The fiber optic parametric amplifier of claim 30, wherein the length of the first fiber is different from the length of the second fiber.

32. The fiber optic parametric amplifier of claim 30, wherein a material property of the first fiber is different from a material property of the second fiber.

33. The fiber optic parametric amplifier of claim 19, wherein the first pulse light is idler light and the second pulse light is signal light.

34. The fiber optic parametric amplifier of claim 19, wherein a wavelength of the first pulse light is longer than a wavelength of the second pulse light.

35. The fiber optic parametric amplifier of claim 15, wherein a wavelength of the first pulse light is longer than the pump wavelength.

36. The fiber optic parametric amplifier of claim 15, wherein the resonating cavity further comprises an optical fiber having chromatic dispersion different from chromatic dispersion of the nonlinear optic gain medium.

* * * * *